United States Patent
Lang et al.

(10) Patent No.: US 11,487,771 B2
(45) Date of Patent: Nov. 1, 2022

(54) PER-NODE CUSTOM CODE ENGINE FOR DISTRIBUTED QUERY PROCESSING

(71) Applicant: Microsoft Technology Licensing, LLC, Redmond, WA (US)

(72) Inventors: Willis Lang, Madison, WI (US); Nikhil Teletia, Madison, WI (US); Hideaki Kimura, Madison, WI (US); Alan D. Halverson, Verona, WI (US); Srinath Shankar, Madison, WI (US); Karthik Ramachandra, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 787 days.

(21) Appl. No.: 15/371,245

(22) Filed: Dec. 7, 2016

(65) Prior Publication Data

US 2017/0083588 A1  Mar. 23, 2017

Related U.S. Application Data

(63) Continuation-in-part of application No. 14/314,952, filed on Jun. 25, 2014, now abandoned.

(51) Int. Cl.
*G06F 16/2458* (2019.01)
*G06F 16/242* (2019.01)
(Continued)

(52) U.S. Cl.
CPC ...... *G06F 16/2471* (2019.01); *G06F 16/2425* (2019.01); *G06F 16/24526* (2019.01); *G06F 16/24532* (2019.01); *G06F 16/24568* (2019.01)

(58) Field of Classification Search
CPC .......... G06F 16/2471; G06F 16/24568; G06F 16/2425; G06F 16/24526; G06F 16/2532; G06F 16/24532
(Continued)

(56) References Cited

U.S. PATENT DOCUMENTS

2007/0198484 A1   8/2007 Ahmed et al.
2008/0059489 A1*  3/2008 Han .................. G06F 16/245
(Continued)

OTHER PUBLICATIONS

"Apache Hadoop NextGen MapReduce (YARN)", Retrieved From: https://hadoop.apache.org/docs/r2.7.1/hadoop-yarn/hadoop-yarn-site/YARN.html, Feb. 11, 2011, 2 Pages.
(Continued)

*Primary Examiner* — Phong H Nguyen
(74) *Attorney, Agent, or Firm* — Alleman Hall Creasman & Tuttle LLP

(57) ABSTRACT

Distributed query processing is often performed by a set of nodes that apply MapReduce to a data set and materialize partial results to storage, which are then aggregated to produce the query result. However, this architecture requires a preconfigured set of database nodes; can only fulfill queries that utilize MapReduce processing; and may be slowed down by materializing partial results to storage. Instead, distributed query processing can be achieved by choosing a node for various portions of the query, and generating customized code for the node that only performs the query portion that is allocated to the node. The node executes the code to perform the query portion, and rather than materializing partial results to storage, streams intermediate query results to a next selected node in the distributed query. Nodes selection may be involve matching the details of the query portion with the characteristics and capabilities of the available nodes.

20 Claims, 10 Drawing Sheets

(51) Int. Cl.
*G06F 16/2452* (2019.01)
*G06F 16/2455* (2019.01)
*G06F 16/2453* (2019.01)

(58) Field of Classification Search
USPC .............................. 707/722, 713, 769, 770
See application file for complete search history.

(56) References Cited

U.S. PATENT DOCUMENTS

| | | | |
|---|---|---|---|
| 2009/0216694 A1* | 8/2009 | Lang ................. | G06F 16/24568 709/221 |
| 2009/0259644 A1 | 10/2009 | Scheuermann | |
| 2011/0302151 A1 | 12/2011 | Abadi et al. | |
| 2012/0215763 A1 | 8/2012 | Hughes et al. | |
| 2013/0086355 A1 | 4/2013 | Narang et al. | |
| 2013/0262443 A1 | 10/2013 | Leida et al. | |
| 2014/0047342 A1* | 2/2014 | Breternitz ............ | G06F 9/5061 715/735 |
| 2014/0195558 A1* | 7/2014 | Murthy ............... | G06F 16/2471 707/770 |
| 2014/0310259 A1* | 10/2014 | Tian .................... | G06F 16/2471 707/718 |
| 2015/0199216 A1* | 7/2015 | Cao ...................... | G06F 9/5027 718/104 |
| 2015/0199408 A1* | 7/2015 | Wulff .................... | G06F 16/245 707/688 |
| 2015/0248462 A1* | 9/2015 | Theeten ............ | G06F 16/24524 707/688 |
| 2015/0362619 A1* | 12/2015 | AlShaikh .............. | G06F 9/5072 703/10 |
| 2016/0004552 A1* | 1/2016 | Innan ................... | G06F 9/5088 718/1 |
| 2016/0004751 A1* | 1/2016 | Lafuente Alvarez .... | G06N 5/04 707/718 |
| 2016/0085809 A1* | 3/2016 | de Castro Alves ......................... G06F 16/24568 707/736 | |
| 2018/0060394 A1* | 3/2018 | Gawande ................ | G06F 16/27 |

OTHER PUBLICATIONS

"Apache Hive TM", Retrieved from: http://hive.apache.org/, Mar. 31, 2014, 2 Pages.

"Oracle SQL Connector for Hadoop Distributed File System", Retrieved from: https://docs.oracle.com/cd/E37231_01/doc.20/e36961/sqlch.htm, Apr. 1, 2014, 26 Pages.

"Final Office Action Issued in U.S. Appl. No. 14/314,952", dated Nov. 1, 2016, 28 Pages.

"Non-Final Office Action Issued in U.S. Appl. No. 14/314,952", dated Jun. 22, 2016, 28 Pages.

Abadi, Daniel, "Classifying the SQL-on-Hadoop Solutions", Retrieved from: https://web.archive.org/web/20131003000516/http://hadapt.com/blog/2013/10/02/classifying-the-sql-on-hadoop-solutions/, Oct. 2, 2013, 3 Pages.

Alexandrov, et al., "Massively Parallel Data Analysis with PACTs on Nephele", In Proceedings of the VLDB Endowment, vol. 3, Issue 1-2, Sep. 2010, 4 Pages.

Babu, et al., "Massively Parallel Databases and MapReduce Systems", In Foundations and Trends in Databases, vol. 5, No. 1, Nov. 20, 2013, 107 Pages.

Bajda-Pawlikowski, et al., "Efficient Processing of Data Warehousing Queries in a Split Execution Environment", in Proceedings of the ACM SIGMOD International Conference on Management of Data., Jun. 12, 2011, pp. 1165-1176.

Brust, Andrew, "Microsoft's PolyBase mashes up SQL Server and Hadoop", Retrieved from: https://www.zdnet.com/article/microsofts-polybase-mashes-up-sql-server-and-hadoop/, Nov. 15, 2012, 4 Pages.

Dewitt, et al., "Split Query Processing in Polybase", In Proceedings of the ACM SIGMOD International Conference on Management of Data, Jun. 22, 2013, 12 Pages.

Graefe, Goetz, "Encapsulation of Parallel in the Volcano Query Processing System", In Proceedings of the ACM SIGMOD International Conference on Management of Data, May 23, 1990, pp. 102-111.

Kalavri, et al., "m2r2: A Framework for Results Materialization and Reuse in High-Level Dataflow Systems for Big Data", In IEEE 16th International Conference on Computational Science and Engineering, Dec. 3, 2013, 8 Pages.

Shankar, et al., "Query Optimization in Microsoft SQL Server POW", In Proceedings of the ACM SIGMOD International Conference on Management of Data, May 20, 2012, pp. 767-775.

Wu, et al., "Query Optimization for Massively Parallel Data Processing", In Proceedings of ACM Symposium on Cloud Computing in conjunction with SOSP, Oct. 26, 2011, 13 Pages.

Xu, et al., "Integrating Hadoop and Parallel DBMS", In Proceedings of ACM SIGMOD International Conference on Management of Data, Jun. 6, 2010, pp. 969-974.

* cited by examiner

PER-NODE CUSTOM CODE ENGINE FOR DISTRIBUTED QUERY PROCESSING

CROSS-REFERENCE TO RELATED APPLICATIONS

This application is a continuation-in-part of, and claims priority under 35 U.S.C. § 120 to, U.S. patent application Ser. No. 14/314,952, entitled "CUSTOM QUERY EXECUTION ENGINE," filed on Jun. 25, 2014, the entirety of which is hereby incorporated by reference as if fully rewritten herein.

BACKGROUND

Within the field of computing, many scenarios involve distributed query processing over a data set, wherein a set of nodes is configured to perform portions of a query. In such scenarios, the contents of a data set may be partitioned over a set of nodes, and each node may apply a query to the subset of the database to which it is assigned. The partial results generated by the nodes may be combined to form a complete query response over the data set.

For example, various computing devices may be configured to join a Hadoop cluster as query processing nodes. When a query is received, each node of the Hadoop cluster applies the query to a subset of the available records (e.g., if a table contains 300,000 records, each of three nodes may apply the query to a 100,000-record subset of the table) by applying Map operations that evaluate data within each record based on specified criteria, and Reduce operations that choose or aggregate records based on other specified criteria. Each node generates a partial query result over the records to which the node applied the MapReduce operations, and materializes the partial query results to storage. Each node may utilize a variety of resources to complete this processing, including processor and network capacity and memory access, and may manage the involved resources through a variety of techniques, such as the Hadoop YARN framework that provides job scheduling by matching the requirements of a query with the available resources of the node. The query result may be aggregated from the partial query results materialized to storage. Additional management of the Hadoop cluster may facilitate the allocation of the data set over the nodes; the transmission of the query to the nodes; load-balancing the nodes to reduce an undue load on a node from delaying the completion of the query; the compilation of the partial query results into a complete query result; and fault detection and recovery.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While MapReduce-based architectures provide a suitable framework for fulfilling many types of distributed queries, reliance on this framework may entail a significant number of disadvantages.

As a first such example, the processing of a query using a Hadoop cluster requires first assembling a cluster of nodes, each equipped and configured to participate in the Hadoop cluster. It may be difficult to generate such a cluster on an ad-hoc basis, and/or to include other devices in the cluster in order to process a particular query.

As a second such example, MapReduce may be a suitable architecture for partitioning the data set over a set of nodes, but less convenient for partitioning the sequence of operations comprising a query over the nodes, wherein a second node applies a second portion of the query to an intermediate query result produced by a first node applying a first portion of the query.

As a third such example, some queries involve processing that is difficult to fit into the MapReduce query processing model, including the YARN resource management model. It may be convenient and/or more efficient to express such queries using different programming or execution models. Moreover, some queries may involve a hybrid of programming or execution models, such as a combination of query portions that may be expressed in different languages or platforms. However, many query processing clusters provide inadequate support for including models other than MapReduce in the distributed processing of a query.

As a fourth such example, materializing partial results to storage may entail an avoidable reduction in query performance. For example, a process may initiate a query, and rather than receiving query results directly from the Hadoop cluster nodes, the process may have to read the results from storage and aggregate the results. Such data transfer may impose a performance bottleneck that reduces the efficient use of the nodes and the timely fulfillment of the query.

As a fifth such example, Hadoop clusters are often based on model where nodes are homogeneous and/or unspecialized, where the processing of a query portion may be allocated to any particular node, and where load-balancing or fault recovery may be achieved by reallocating processing from an overloaded and/or failing node to any other node of the cluster. However, many clusters may comprise heterogeneous devices, such that it may be desirable, or even necessary, to choose a particular node in order to process a particular query portion. Hadoop may be unhelpful in choosing particular nodes to perform the respective portions of the query.

In view of these and other observations, presented herein are techniques for performing distributed query processing in a more robust, comprehensive, and/or efficient manner. In accordance with these techniques, a server receives a query to be processed in a distributed manner using a node set comprising at least two nodes. The server partitions the query into at least two query portions. For the respective query portions, the server chooses a node from the node set to perform the query portion, and generates a query instruction set. When the query instruction set is executed by the node, the node performs the query portion, and if the execution generates an intermediate query result, the node transmits the intermediate query result to a next selected node of the node set that has been assigned to execute a next query portion of the query. The server deploys the query instruction sets to the respective nodes, and causes the selected nodes to execute the query instruction sets that together represent the query. In this manner, the server and nodes interoperate to achieve the distributed processing of the query in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings. Also, while some embodiments of the techniques presented herein may address one or more of the disadvantages noted above, it is to be appreciated that these examples are only illustrative in nature; other embodiments may not address such disadvantages, and/or may be usable in a different context and/or uses of the techniques presented herein.

DETAILED DESCRIPTION

Figure 1:
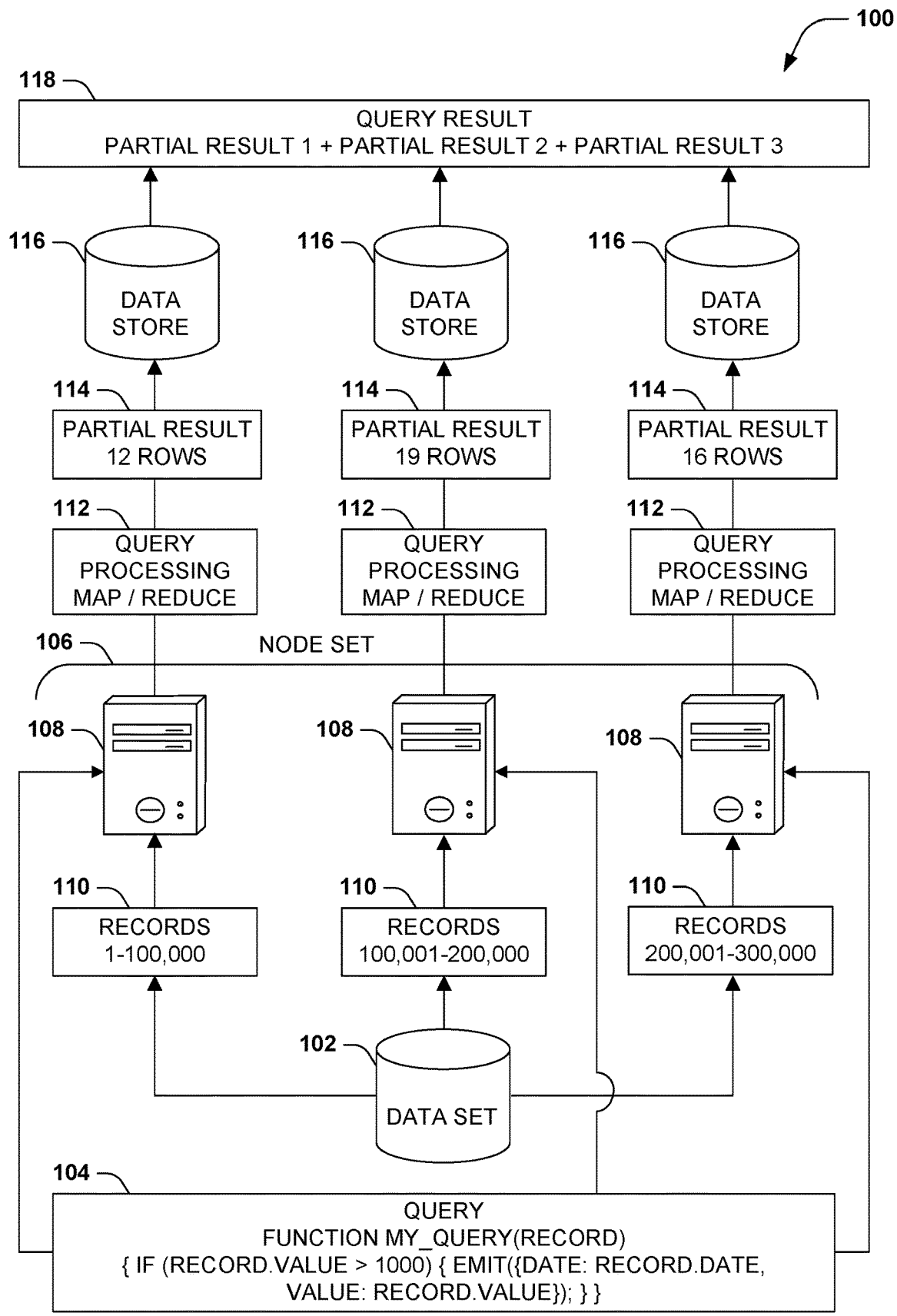
FIG. 1 is an illustration of an example scenario featuring a query processed over a data set in a distributed manner.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 featuring a distributed query processing technique. It is to be appreciated that FIG. 1 does not provide the techniques presented and claimed herein, but rather an alternative technique for processing a distributed query.

In the example scenario 100 of FIG. 1, a data set 102 is targeted by a query 104 to be performed by a node set 106 comprising three nodes 108. The data set 102 comprises a set of records 110, such as the rows of a database or the tuples of a tuple space. The query 104 in this example scenario 100 is specified in a language such as a variant of the Structured Query Language (SQL), and the specifies a sequence of operations to be applied to the records 110, such as filtering the records 110 by specified criteria to choose a subset of the records 110, and projecting a subset of the attributes of the record subset. The In this example scenario 100, the node set 106 interoperates to fulfill the query 104 using distributed processing in the following manner. Respective nodes 108 of the node set 106 are responsible for applying the query 104 to a subset of the records 110 of the data set 102; e.g., the first node 108 is responsible for applying the query 104 to the first 100,000 records, and the second and third nodes 108 are responsible for applying the query 104 respectively to the second and third sets of 100,000 records. The respective nodes 108 perform query processing 112 on an assigned subset of the records 110, such as a Map operation that projects the selected attributes and a Reduce operation that filters the records by the specified criteria. The respective nodes 108 generate a partial result 114 of the query 104 applied over a particular subset of records 110, and store the partial results 114 to the data store 116. A combination of the partial results 114 provides the complete query result 118, which may be provided in response to the query 104.

The distributed query processing technique presented in the example scenario 100 of FIG. 1 may be suitable for processing many types of queries 104 against many types of data sets 102. It may be appreciated that such techniques may be utilized by a variety of query processing systems, such as the Hadoop query processing architecture.

However, query processors that utilize the query processing technique of FIG. 1 may also exhibit a number of disadvantages.

As a first such example, using the query processing technique of FIG. 1 to evaluate a particular query 104 may require first generating a node set 106 of nodes 108 that are equipped and configured to participate in the query processing technique. For example, the respective nodes 108 may have to store and use software that enables the node 108 to participate in the node set 106, including the particular architecture and protocols used by the other nodes 108 to coordinate the query processing, such as the Hadoop client wire protocol and support for the Hadoop distributed file system. Nodes 108 that do not utilize such architecture and protocols may not be capable of participating in the node set 106.

As a second such example, the architecture of the example scenario 100 of FIG. 1 may only be suitable for the types of queries that are supported by the distributed query processing architecture. For example, because Hadoop clusters are typically configured to apply query process in the form of MapReduce, it may be difficult to utilize a Hadoop cluster to process queries that are not feasible or convenient to express in MapReduce form.

As a third such example, the architecture of the example scenario 100 of FIG. 1 involves a loose coordination of the nodes 108, wherein each node 108 completes its query processing 112 of a subset of records 110, and materializes a partial result 114 in the data store 116. In some scenarios, this architecture may be advantageous, e.g., where different nodes 108 may complete the query processing 112 within an arbitrary timeframe and without regard to the progress and/or completion of the query processing 112 by other nodes 108. The query result 118 may be aggregated when all of the nodes 108 have materialized a partial result 114 on a data store 116. However, in other scenarios, this query processing may incur undesirable limitations. For example, it may be difficult to configure the node set 106 to process the queries 104 in a streaming manner, wherein a first node 108 performs a first portion of the query 104, and transmits an intermediate result to a second node 108 to perform a subsequent portion of the query 104. For instance, it may be desirable for a first node 108 may perform a Reduce function, and a second node 108 to perform a Map function on the records 110 identified by the first node 108. Such sequentially distributed query processing may be desirable in some scenarios, e.g., where the nodes 108 process a stream of queries 104 and/or records 110, such that sequential processing may enable pipelined processing that promotes the efficient processing of queries 104 and records 110. Because the architecture in the example scenario 100 of FIG. 1 depends upon nodes 108 materializing partial results 114 to a data store 116, alternative configurations that involve directly transmitting results to another device may not be achievable. Because the architecture in the example scenario 100 of FIG. 1 depends upon nodes 108 materializing partial results 114 to a data store 116, alternative configurations that involve directly transmitting results to another device may not be achievable.

As a fourth such example, the dependency of the example architecture 100 of FIG. 1 on materializing partial results 114 to a data store 116 may entail a first delay while a node 108 writes a partial result 114 to the data store 116, and a second delay while the partial result 114 is retrieved from the data store 116. If the partial result 114 generated by a node is to be promptly consumed, these delays may exhibit an inefficiency as compared with configuring the node 108 to transmit the partial result 114 directly to another device that consumes the partial result. As one such example, in a scenario involving stream processing of the query 104 and/or records 110, rather than materializing a partial result 114 to a data store 116, it may be desirable to transmit incremental sets of partial results 114 in a stream and/or batch manner, thereby enabling a second device to consume and/or further process the processing results of some records 110 while the node 108 continues applying the query processing 112 to additional records 110. Because the architecture in the example scenario 100 of FIG. 1 depends upon nodes 108 materializing partial results 114 to a data store 116, alternative configurations that involve directly transmitting results to another device may not be achievable. Additionally, the example scenario 100 of FIG. 1 depends upon the availability of data stores 116 with sufficient capacity to store the partial results 114, as well as communications infrastructure and capacity among the nodes 108 and the data stores 116; such resources may be reduced and/or eliminated in simpler scenarios where a node 108 directly transmits the results of query processing 112 to a second device.

As a fifth such example, in the example scenario 100 of FIG. 1, the nodes 108 of the node set 106 are regarded as equivalent and/or fungible; i.e., no consideration is given as to the records 110 processed by the respective nodes 108, nor the type of query processing 112 that each node 108 applies thereto. Such architectures may be suitable for node sets 106 featuring identical nodes 108 that utilize the same hardware and/or software, are equipped with the same resources, and/or occupy the same functional role in the query processing system. However, many node sets 106 include heterogeneous nodes 108 that may differ by hardware, software, resources, roles, and/or other considerations. Such heterogeneity may cause unanticipated problems in query processing scenarios that do not account for such differences; e.g., allocating equivalent-size subsets of records 110 to both a faster node 108 and a slower node 108 may enable the faster node 108 to complete the query processing faster 112, while the slower node 108 incurs an extended delay in completing the query processing 112. In addition to fulfillment the completion of the query 104 and the availability of the query result 118, such arbitrary distribution among heterogeneous nodes 108 may cause the faster node 108 to remain idle and unproductive during the protracted delay incurred by the slower node 108. Greater efficiency may be achievable by considering the characteristics and capabilities of the nodes 108 while distributing the query 104 thereamong, and/or in choosing the distribution of the query 104 in view of the characteristics of the available nodes 108. However, the architecture in the example scenario 100 of FIG. 1 may be incapable of supporting such matching, and may default to an arbitrary distribution of the query 104 over a node set 106 that is anticipated as being heterogeneous. Many such problems may arise in the distributed processing of queries 104 in accordance with the example scenario 100 of FIG. 1.

B. Presented Techniques

Figure 2:
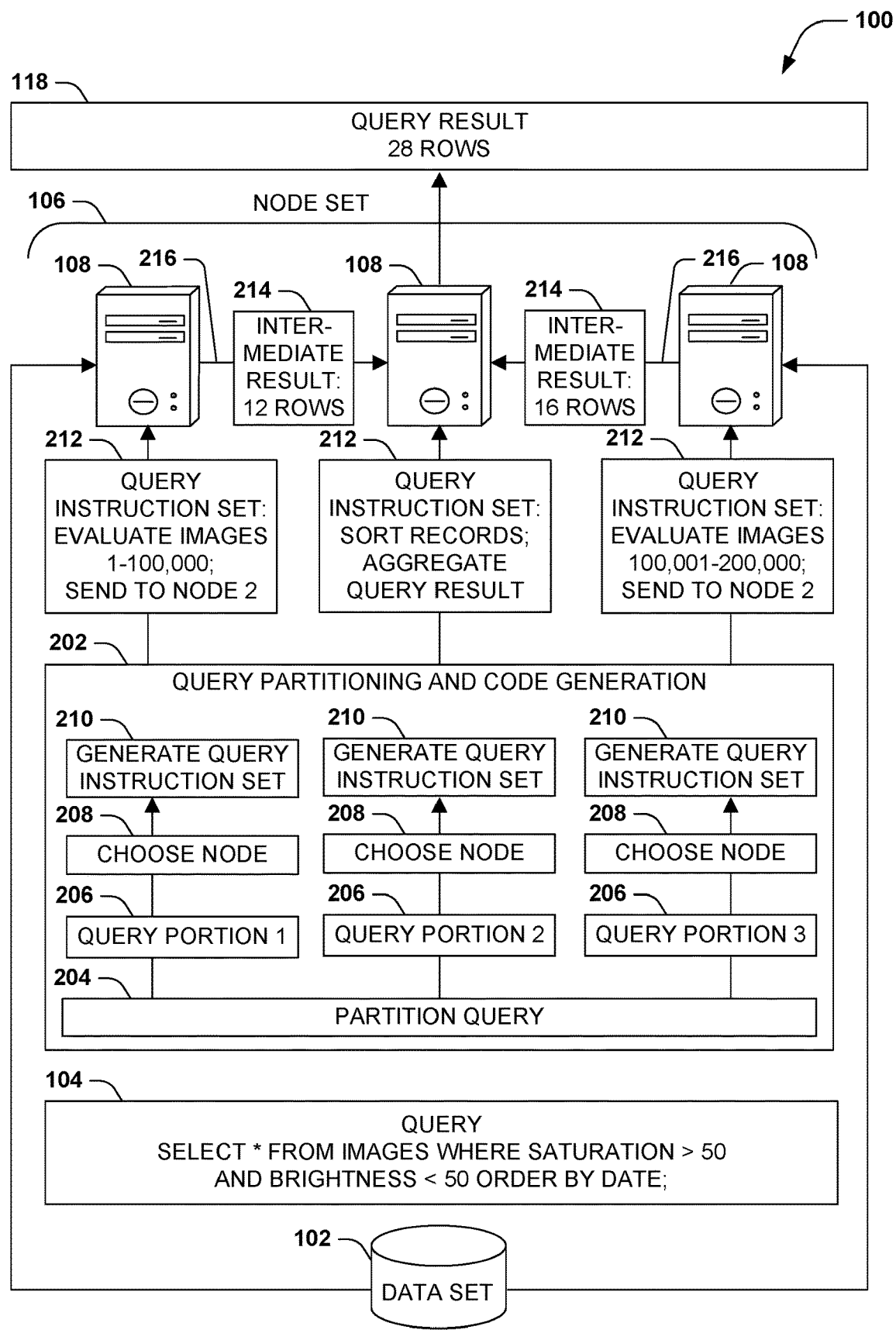
FIG. 2 is an illustration of an example scenario featuring a query processed over a data set in a distributed manner in accordance with the techniques presented herein.

FIG. 2 is an illustration of an example scenario 200 featuring distributed query processing in accordance with the techniques presented herein, which involve a different type of query partitioning that involves generating code for respective query portions of the query 104, where code is generated for the respective nodes 108 that implements a portion of the query 104.

In this example scenario 200, a query 104 is to be applied to a data set 102 by a node set 106 of nodes 108. A query partitioning and code generation 202 is applied to the query 104 in the following manner. The query 104 is first partitioned into at least two query portions 206, such as a Map operation and a Reduce operation, or a Select operation and a Project operation. For the respective query portions 206, a choice 208 is made of a selected node 108 of the node set 106 that is to perform the query portion 206. For the respective query portions 206 and the selected node 108 that is chosen therefor, a query instruction set 212 is generated 210, wherein the query instruction set 212, when executed by the selected node 108, causes the selected node 108 to implement the query portion 206 of the query 104. Additionally, if the query portion 206 produces an intermediate result 214—such as a selection of records (e.g., SQL WHERE, or MapReduce Map) to which a subsequent query portion 206 is to be applied (e.g., SQL SELECT, or MapReduce Reduce), the execution of the query instruction set 212 also causes the selected node 108 to transmit 216 the intermediate result 214 to a next selected node 108 that applies the subsequent query portion 206 to the intermediate result 214. After the custom instruction set 212 is generated 210 for a selected query portion 206, the query instruction set 210 is transmitted to the selected node 108. The selected nodes 108 are then instructed to invoke the query instruction sets 210, which causes the set of selected nodes 108 to execute the query instruction sets 210 that, together, cause the selected nodes 108 to perform the entire query 104 in a distributed manner.

More particularly, in this example scenario, the query 104 relates to an analysis of images stored in an image data set 102, such as a photo library. The query 104 involves a detailed analysis of the contents of the data set 102, such as a determination of the saturation and brightness of the respective images, in order to identify images that comprise certain visual qualities. Additionally, the query 104 concludes with an ORDER BY operation that causes the images matching the identified criteria to be reported in a particular sort order, such as the chronological dates of the images. This sorting is achieved by configuring the first selected node 108 and the second selected node 108 to transmit intermediate results 214 of the query 104 to a third selected node 108, as the next selected node 108 in the processing of the query 104. The third selected node 108 receives the intermediate results 214 from the other selected nodes 108, executes the query instruction set 212 for the third selected node 108 that implements the ORDER BY operation on the collection of intermediate results 214, and provides a query result 118 that fulfills the query 104. In this manner, the nodes 108 of the node set 106 interoperate to complete the evaluation of the query 104 against the data set 102 in accordance with the techniques presented herein.

C. Technical Effects

Various uses of the techniques presented herein to cause a node set 106 to evaluate a query 104 against a data set 102 may result in a variety of technical effects.

A first technical effect that may be achieved according to the techniques presented herein involves a reduced reliance on the availability and use of a data store 116 to materialize the partial results 114, where reducing or avoiding the transient use of a data store 116 by transmitting intermediate results 214 directly to another node 108 of the node set 106, such as in the example scenario 200 of FIG. 2, may provide some efficiency gains. As a first example, direct transmission may reduce delays in the provision of the query result 118 (e.g., storing and/or retrieving partial results 114 may impose a performance bottleneck on the overall processing of the query 114, particularly if the partial results 114 comprise a large volume of data or are generated and/or retrieved by a large number of selected nodes 108, and/or where the serialization and/or deserialization of the partial results 114 is nontrivial, such as a complex graph of interconnected objects). As a second example, a node 108 that utilizes partial results 114 materialized to a data store 116 to provide the query result 118 may not be promptly notified of the availability of the partial results 114; either the node 108 may be notified and/or discover the availability of the partial results 114 after a potentially significant delay, and/or the node 108 may have to utilize an inefficient polling mechanism to monitor the data store 116 to detect the availability of the partial results 114. As a third example, dependency upon a data store 116 may involve an additional hardware expense to acquire, configure, and maintain the data store 116, and also an additional point of failure (e.g., a failure, inaccessibility, and/or capacity exhaustion of the data store 116 may cause a failure of the query processing engine), which may be avoided by configuring nodes 108 to transmit intermediate results 214 to other nodes 108 of the node set 106 such as in the example scenario 200 of FIG. 2 and in accordance with the techniques presented herein.

A second technical effect that may be achieved according to the techniques presented herein involves additional flexibility in generating query instruction sets 212 in view of the types and capabilities of the particular nodes 108. In the example scenario 100 of FIG. 1, only nodes 108 that implement the particular query model of the query processing architecture (e.g., SQL queries for an SQL query cluster) may be included in the node set 106 for the distributed processing of queries 104, and only queries written according to the constraints of the query processing architecture may be evaluated by the node set 106 (e.g., only queries 104 written entirely in SQL may be processed by an SQL processing node set 106). By contrast, the example scenario 200 of FIG. 2 may utilize a node set 106 comprising any node 108 for which at least one query portion 206 may be generated in any language that is supported by the node 108. For example, if a query portion 206 that involves a sorting of intermediate results 214 is to be executed by a first selected node 108 that comprises an SQL-based query processing engine, the query instruction set 212 may comprise an SQL instruction set featuring an ORDER BY operation; if by a second selected node 108 that comprises a Python processing engine, the query instruction set 212 may comprise a Python script utilizing the Python sorted( )method; and if by a third selected node 108 that comprises a Java processing engine, the query instruction set 212 may comprise a Java compiled application utilizing the java.util.Arrays.sort( ) method. Some such node sets 106 may comprise a heterogeneous mix of nodes 108 of many types, and despite such differences, the nodes 108 may be utilized together to complete the processing of a query 104.

A third technical effect that may be achieved according to the techniques presented herein involves the opportunity to express and process some types of queries 104 that may not be possible in more conventional query models. For example, in the example scenario 200 of FIG. 2, the query 104 is applied to a data set 102 comprising images, and the query 104 specifies a filtering of the images based upon an evaluation of the image contents (e.g., the saturation and brightness levels of the images). If such data is not stored in metadata that describes the images but may only be determined by evaluating the contents of the images, it may not be possible to specify such evaluation as part of the query 104 specified in many languages that do not involve image evaluation resources; e.g., traditional variants of SQL do not include any SQL operators that involve analyzing the content of an image. However, in the example scenario 200 of FIG. 2, the query instruction sets 210 may be generated using programming languages, libraries, and resources that feature such capabilities; e.g., a Python script that invokes a Python image analysis library may be generated as the query instruction set 212 for WHERE portion of the query 104, and deployed to a selected node 108 that is capable of evaluating of Python scripts and using the image evaluation library. In this manner, queries 104 that are not possible to specify and/or evaluate in a standardized query language may be fulfilled by generating custom code for the respective nodes 108 of the node set 106.

Many such technical effects may be achieved through the distributed processing of a query against a data set in accordance with the techniques presented herein.

D. Example Embodiments

The following figures and descriptions present a variety of example embodiments of the techniques presented herein. Each figure presents an example of such an embodiment. It is to be appreciated that such examples are not the only possible implementations of the presented techniques, and that other embodiments may vary in some aspects while fully embodying the techniques presented herein.

D1. Example Embodiments

Figure 3:
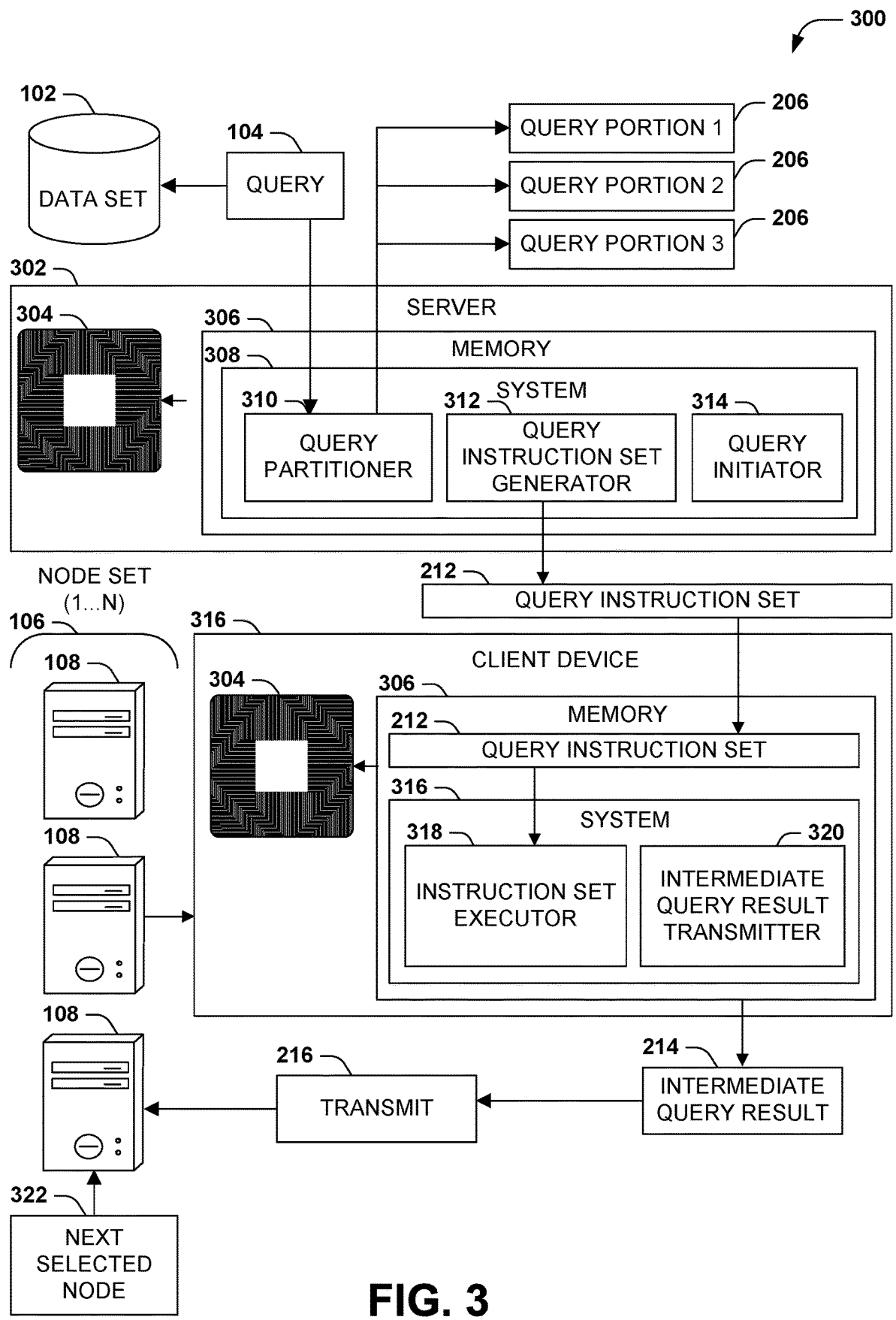
FIG. 3 is an illustration of an example server and an example node set that interoperate to process a query over a data set in a distributed manner in accordance with the techniques presented herein.

FIG. 3 presents an example scenario 300 featuring a processing of a query 104 over a data set 102 in a distributed manner, in accordance with the techniques presented herein.

The embodiments presented in the example scenario 300 of FIG. 3 enable the fulfillment of the techniques presented herein in the following manner. The system 308 of the example server 302 comprises a query partitioner 310 that partitions the query 104 into at least two query portions 206. For example, the query partitioner 310 may partition the query 104 based upon the number, kinds, and sequence of operators comprising the query 104; e.g., a query 104 specified in SQL may be partitioned into a first query portion 206 comprising a "SELECT NAME, DATE FROM RECORDS" operation that projects selected records from a data set; a second query portion 206 comprising a "WHERE DATE>#1/1/2012#" operation that chooses a subset of records of the data set based on a filter criterion; and an "ORDER BY DATE" operation that sorts the records of the data set. The example server 302 also comprises a query instruction set generator 312 that, for the respective query portions 206, chooses, from the node set 106, a selected node 108 to perform the query portion 206; generates a query instruction set 212 for the selected node 108; and deploys the query instruction set 212 to the selected node 108. The example system 318 of the client device 316 comprises an instruction set executor 318 that receives the query instruction set 212 generated for the client device 316 that expresses the selected query portion 206 of the query 104, stores the query instruction set 212 on the client device 316, and initiates the execution of the query instruction set 212 by the processor 304 of the client device 316. The example system 308 of the example server 302 also comprises a query initiator 314 that causes the selected nodes 108 of the node set 106 to initiate the processing of the respective query instruction sets 212 that together represent the query 104, thereby causing the node set 106 to achieve the distributed processing of the query 104.

More particularly, the query instruction set 212 generated for the selected node 108 and the query portion 208 by the query instruction set generator 312 comprises instructions that, when executed by a client device 316 operating as a selected node 108 of the node set 106, cause the selected node to perform the query portion 206 of the query 104 for which the node 108 was selected. The query instruction set 212 may be provided in any query language or programming language that the selected node 108 for the corresponding query portion 206 supports, including a different query language or programming language than that used to express the corresponding query portion 206 of the query 104. Additionally, for query portions 206 that generate an intermediate query result 214 (e.g., an intermediate record set to which other query portions 206 of the query 102 are to be applied in order to incorporate the record set into the query result 118), the query instruction set 212 indicates the next selected node 322 of the node set 106 to which the selected node 108 is to transmit the intermediate query result 214 for further processing. By executing the query instruction set 212 indicating the next selected node 322, a client device 316 operating as such a selected node 108, after completing the query portion 206 to generate the intermediate query result 214, transmits the intermediate query result 214 to the next selected node 322 for further processing. In this manner, the example server 302 and client device(s) 316 operating as selected nodes 108 of the node set 106 interoperate to achieve the distributed processing of the query 104 against the data set 102 in accordance with the techniques presented herein.

The example scenario 300 of FIG. 3 also presents an example client device 316 that may serve as a node 108 of the node set 316. The example client device 316 also comprises a processor 304 and a memory 306 storing instructions that, when executed by the processor 304 of the client device 316, cause the client device 306 to provide a system 316 that enables the client device 316 to participate in the distributed processing of the query 104 against the data set 102 by the node set 106 in accordance with the techniques presented herein. In particular, the system 316 comprises an instruction set executor 318, which receives a query instruction set 212 from the server 302, generated for the client device 316, that expresses a query portion 206 of the query 104, and that specifies a next selected node 322 of the node set 106. The instruction set executor 318 also executes the query instruction set 212 to produce an intermediate query result 214. The system 316 also comprises an intermediate query result transmitter 320, which transmits 216 the intermediate query result 214 to the next selected node 322 of the node set 106, as specified by the query instruction set 212. In this manner, the system 316 enables the client device 316 to participate in the node set 106 and the evaluation of the query 104 in a distributed manner in accordance with the techniques presented herein.

Figure 4:
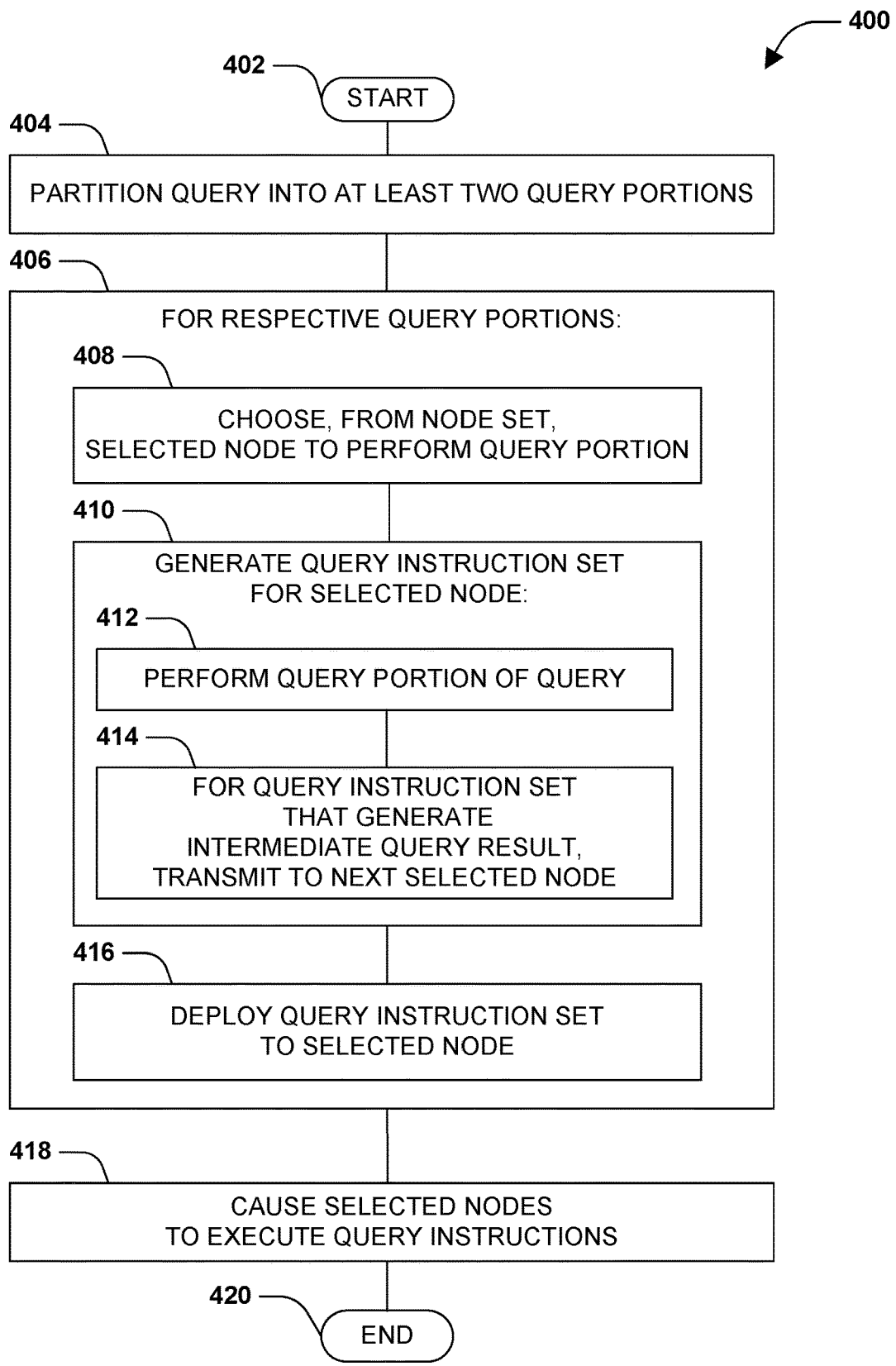
FIG. 4 is an example method of processing a query over a data set in a distributed manner in accordance with the techniques presented herein.

FIG. 4 is a flow diagram of an example method 400 of executing a query 102 using a node set 106 comprising at least two nodes 108. The example method 400 may be implemented, e.g., as a set of instructions stored in a memory of a device, such as the server 302 in the example scenario 300 of FIG. 3. The instructions may be stored on various types of memory devices, such as a hard disk drive, a solid-state storage device (SSD), an optical medium such as a digital video disc (DVD), or a flash memory device, wherein execution of the instructions causes the server 302 to operate in accordance with the techniques presented herein.

The example method 400 begins at 402 and involves partitioning 404 the query 104 into at least two query portions 206. The example method 400 also involves, for respective 406 query portions 206, choosing 408, from the node set 106, a selected node 108 to perform the query portion 206; generating 410 a query instruction set 212 for the selected node 108, wherein execution of the query instruction set 21 causes the selected node 108 to perform 412 the query portion 206 of the query 104, and, for query portions 206 that generate an intermediate query result 214, transmit 414 the intermediate query result 214 to a next selected node 322 of the node set 106; and deploying 416 the query instruction set 212 to the selected node 108. The example method 400 also involves causing 418 the selected nodes 108 of the node set 106 to execute the query instruction sets 212 that together represent the query 106. In this manner, the execution of the example method 400 of FIG. 4 enables a device such as a server 302 to achieve the evaluation of the query 104 over the data set 102 in accordance with the techniques presented herein.

Figure 5:
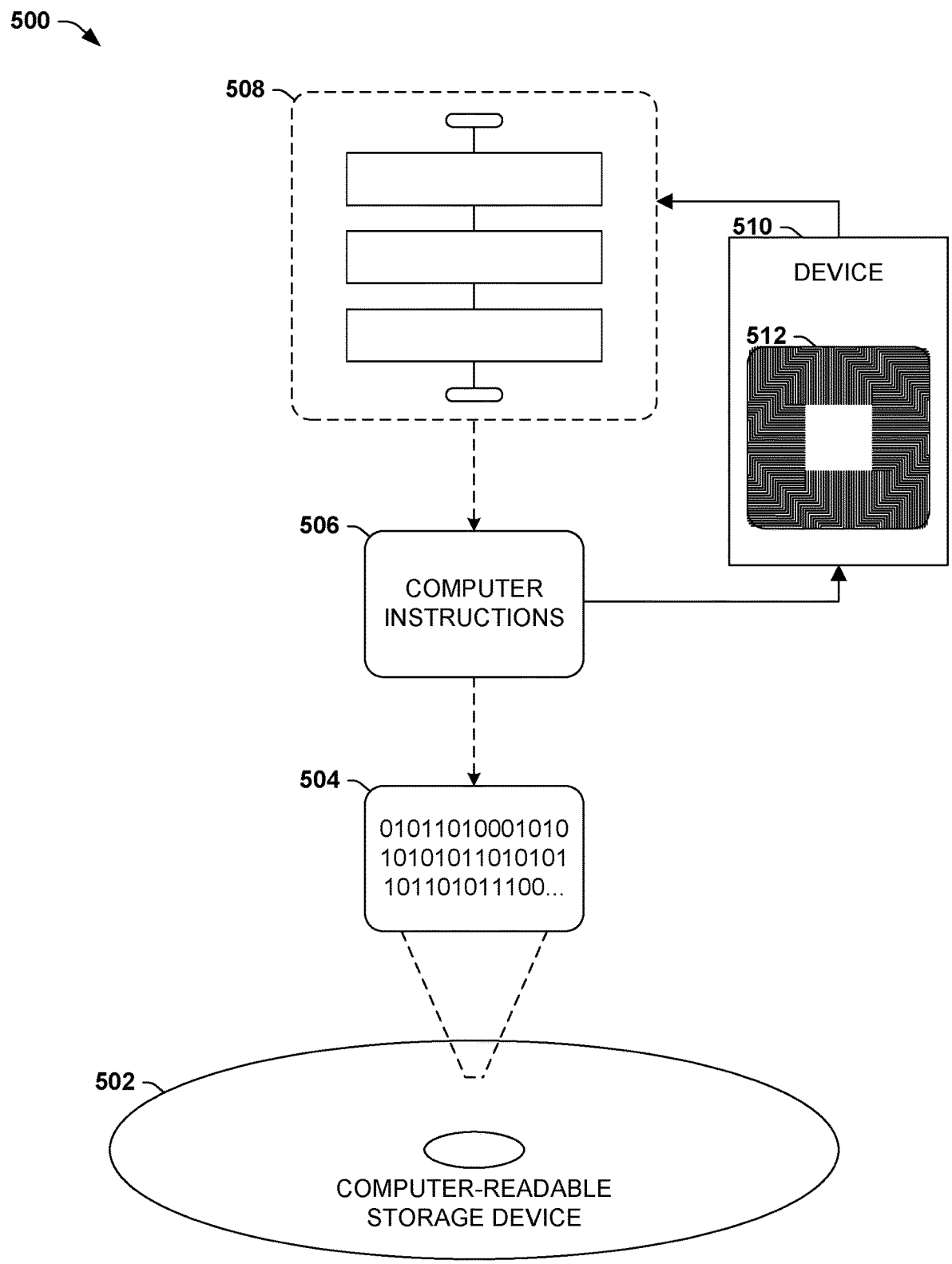
FIG. 5 is an illustration of an example computer-readable storage device storing instructions that enable a device to participate in the processing of a query over a data set in a distributed manner in accordance with the techniques presented herein.

FIG. 5 is an illustration of a second example embodiment of the techniques presented herein, illustrated as an example method 500 of providing access to a database 102 comprising at least two tables 104 respectively comprising fields 106 and a set of records 108 comprising values 110 for the respective fields 106. The example method 500 may be implemented, e.g., as a set of instructions stored in a memory component of a database server 402, such as a memory circuit, a platter of a hard disk drive, a solid-state storage device, or a magnetic or optical disc, and organized such that, when executed on a processor of the device, cause the database server 402 to operate according to the techniques presented herein.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

An example computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that, when executed on a processor 508 of a device 510, cause the device 510 to operate according to the principles set forth herein. In a first such embodiment, the processor-executable instructions 606 of the computer-readable storage device 502 may produce a server that evaluates a query 104 over a data set 102 using a node set 106 of nodes 108, such as the example server 302 in the example scenario 300 of FIG. 3. In a second such embodiment, the processor-executable instructions 506 of the computer-readable storage device 502 may produce an example system that causes a client device to participate in a node set 106 that evaluates a query 104 over a data set 102 in a distributed manner, such as the example client device 316 of FIG. 3. In a third such embodiment, the processor-executable instructions 506 may cause a device such as a server to perform a method of evaluating a query 104 over a data set 102 in accordance with the techniques presented herein, such as the example method 400 of FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example database server 402 of FIG. 4; the example system 408 of FIG. 4; the example method 500 of FIG. 5; and/or the example computer-readable storage device 602 of FIG. 6) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to achieve the configuration of a variety of devices as a database server 402 that is configured in the manner presented herein, such as workstations, laptops, tablets, mobile phones, game consoles, portable gaming devices, portable or non-portable media players, media display devices such as televisions, appliances, home automation devices, computing components integrated with a wearable device integrating such as eyewear or a watch, and supervisory control and data acquisition (SCADA) devices.

As a second variation of this first aspect, the techniques presented herein may be utilized with many kinds of databases 102, such as relational databases; key/value stores; hierarchical data sets such as Extensible Markup Language (XML) documents; object databases; and document-oriented storage systems. It may be appreciated that while the examples herein utilize relational databases as a familiar example, the various elements of such relational databases often have functional equivalents in other database types. For example, in an object database, the records 108 of the tables 102 may correspond to instances of objects of a particular object type; the fields 106 and values 110 of the records 108 may correspond to the fields and values 110 of the object instances; and relations 112 between related records 108 in different tables 104 may correspond to pointers or references stored in one object instance and referencing a different object instance. In view of such functional equivalents among various types of databases, the techniques presented herein are applicable to a wide variety of databases to address similar types of problems that may arise therein. Similarly, the queries 210 specified against such databases 102 may be implemented using a variety of query languages, such as a variant of the Structured Query Language (SQL); the XPath query language provided for XML-structured documents; and/or a "twig" query specified for an unstructured document-oriented storage system.

As a third variation of this first aspect, the techniques presented herein may be utilized to provide query responses 214 to queries 210 submitted by many types of requesters 212. For example, the requesters 212 may comprise various departments, units, or entities within a large enterprise; different entities in a collaborative, such as a business or academic consortium; different users in a user set; different applications in an application set; different devices in a device set; and/or different processes executing on one or more devices.

As a fourth variation of this first aspect, the techniques presented herein may be utilized with databases 102 to which many types of security policies 202 may have been applied. Such security policies 202 may comprise, e.g., a table-level security policy 202 that specifies the requesters 212 that are permitted to access and/or restricted from accessing the respective tables 104 of the database 102; requester-level security that indicates the permissions 206 and/or restrictions 208 to the database for the respective requesters 212; and/or query-level security that indicates the types of queries 2120 that are applicable to the database 102. Many such scenarios may be device to which the techniques presented herein may be applicable.

E2. Query Partitioning and Node Selection

A second aspect that may vary among embodiments of the presented techniques involves the manner of partitioning the query 104 over the nodes 108 of the node set 106.

As a first variation of this second aspect, the query 104 may be partitioned into query portions 206 in a number of ways. As a first example of this first variation of this second aspect, the query 104 may be partitioned at logical operators, where each query portion 206 involves the application a first logical operator to the data set 102 and produces an intermediate query result 214, which is transmitted 216 to a second node 108 to apply a following query portion 206 representing a second logical operator. For instance, the SQL query "SELECT (attributes) FROM (table) WHERE (filter condition)" may be partitioned into a first query portion 206 representing the FROM selection; a second query portion 206 representing the WHERE filtering condition; and a third query portion 206 representing the SELECT projection.

As a second example of this first variation of this second aspect, a particular logical operator may be partitioned over two query portions 206; e.g., a WHERE clause specifying multiple filtering criteria may be partitioned into a first query portion 206 applying a first type of filtering, and a second query portion 206 applying a second type of filtering. As a third such example, the partitioning may be achieved by partitioning the data set 102 into two or more subsets, where respective query portions 206 involve applying one or more logical operators over a particular subset of the data set 102. For instance, the data set 102 may be distributed over the node set 106, and respective nodes 106 may apply a query operator to the subset of the data set 102 that is stored by and/or accessible to the node 106. In this model, the nodes 108 selected from the node set 106 may be arranged as a processing chain or pipeline; e.g., a node 108 may receive a first intermediate result 214 produced by a previous selected node 108 by performing a previous query portion 206 of the query 104, may execute the query instruction set 212 over the first intermediate result 214 to produce a second intermediate query result 214, and may transmit the second intermediate query result 214 to a next selected node 322 of the node set 108. Hybrid models may also be utilized to partition the query 104; e.g., the query 104 may be partitioned both with respect to the data set 102 and with respect to the logical operators of the query 104.

As a second variation of this second aspect, respective nodes 108 may be selected from the node set 106 using a load-balancing technique. For example, if the query 104 is partitioned into m query portions 206, then among the nodes 108 1 . . . N of the node set 106, the m nodes 108 having the lowest current processing load may be selected, and one query portion 206 may be assigned to each of the m selected nodes 108. Additionally, the partitioning may be arbitrary (e.g., choosing any of the m selected nodes 108 for each query portion 206), and/or may be based upon an evaluation of the computational complexity of processing the respective query portions 206 (e.g., a query portion 206 presenting the greatest computational complexity, and/or applicable over a largest partition of the data set 102, may be allocated to the node 108 having the currently lowest processing load, while less computationally complex query portions 206 may be allocated to nodes 108 having higher current processing loads).

As a third variation of this second aspect, the selection of nodes 108 for the respective query portions 206 may be based on the capabilities of the nodes 108. For example, a selected query portion 206 may involve query processing of a selected query processing type (e.g., the application of a particular type of query operator or calculation, such as an image evaluation step, or the capability of evaluating query portions 206 specified in a particular query language). Choosing nodes 108 for the respective query portions 206 may therefore involve evaluating the nodes 108 of the node set 106 to identify candidate nodes that are capable of performing query processing of the selected query processing type (e.g., identifying which nodes 108 are able to apply a particular image evaluation technique to images), and choosing the selected node 108 for the selected query portion 206 from among the candidate nodes. Alternatively or additionally, if no node 108 is capable of fulfilling the query processing type of a query portion 206, techniques may be invoked to generate a node 108 with such capabilities (e.g., automatically installing resources on the node 108 that provide the capability, and/or notifying an administrator of the unavailability of a node 108 with the capability).

As a first example of this third variation of this second aspect, a selected query portion 206 involves a resource, such as a portion of the data set 102 over which the selected query portion 206 is processed, or a processing algorithm or library that is utilized to evaluate the query portion 206 over the data set 102. Choosing the selected node for 108 the selected query portion 206 may therefore involve evaluating the respective nodes 108 of the node set 106 to identify candidate nodes 108 that have access to the resource involved in the selected query portion 206, and choosing the selected node 108 for the selected query portion 206 from among the candidate nodes 108.

As a second example of this third variation of this second aspect, a particular query portion 206 of the query 104 may involve proprietary processing, such as a query portion 206 that utilizes trade-secret business knowledge, or a query portion 206 applicable to a portion of the data set 102 that comprises proprietary information. The node set 106 may further comprise at least one trusted node 108 that is trusted to perform the proprietary processing, and at least one untrusted node 108 that is not trusted to perform the proprietary processing. Accordingly, node selection for evaluation of the query 104 (and particularly the proprietary query portion 206) choosing the selected node for the proprietary query portion may further comprise choosing the selected node 108 only from among the at least one trusted node 108 of the node set 106.

As a third example of this third variation of this second aspect, a particular query portion 206 of the query 104 may utilize a node 108 with a particular configuration. For instance, some query portions 206 may be provided in a general-purpose programming language, such as Java or Python, and may therefore be fulfilled by any device that is capable of evaluating query portions 206 specified in such languages. Other query portions 206 may depend upon a more specialized configuration of the node 108; e.g., a query portion 206 involving a MapReduce architecture may utilize nodes 108 that are part of a Hadoop cluster, and may be unable to utilize nodes 108 that are not part of such a cluster.

As a fourth variation of this second aspect, node selection may involve an estimation of the processing costs of utilizing respective nodes 108 of the node set 106 to perform the query portion 206. For example, a first partitioning of the query 104 and/or node selection for evaluation thereof may present a first processing cost aggregated over the selected nodes 108 and query portions 206, while a second partitioning of the query 104 and/or node selection may present a lower processing cost than the first processing cost. Processing costs may be determined by various characteristics, such as overall completion time of processing the query 104; utilization, including of computational resources, including conservation of resources (e.g., selecting as few nodes 108 as possible to achieve the query processing in a distributed manner); the total network bandwidth utilized in transmitting 216 results and/or accessing the query set 102, and scalability to handle a larger data set in a more amenable manner. the financial costs entailed by selecting various nodes 108 for the respective query portions 206; and/or the opportunity cost of choosing a particular node 108 for evaluating a particular query portion 206, in view of other tasks to which the particular node 108 may be applied. As a first such example, a selected query portion 206 of the query 104 may involve a data subset that is not stored by a first node 108 of the node set 106, and estimating the processing cost for the first node 106 may further involve estimating the cost of delivering the data subset to the first node 108 of the node set 106. For instance, when a first selected node 108 transmits an intermediate query result 214 to a next selected node 322, query processing latency may be increased, and/or throughput may be delayed, and such delay may be estimated and/or monitored as an assessment of cost. As a second such example, a processing performance may be estimated that a selected node 108 utilizes for the selected query portion 206, and nodes 108 of the node set 106 may be selected according to the processing performance of the respective nodes 106.

As a fifth variation of this second aspect, the partitioning of the query 104 into query portions 206 may be performed in particular view of the nodes 108 of the node set 106 that are available to evaluate the query portions 206. As a first such example, if the node set 106 comprises three nodes 108, the query 104 may be partitioned into three query portions 206. As a second such example, if the query 104 involves a proprietary query portion 206 and a non-proprietary query portion, and the node set 106 includes two proprietary nodes 108, the proprietary portion of the query node set 106 may be partitioned into two query portions 206 for allocation specifically to the proprietary nodes 108. It may be appreciated that the partitioning of the query 104 into query portions 206 and the selection of nodes 108 for assignment thereto may be a mutual, cooperative, and/or holistic process, where both tasks are achieved in view of the progress of the other task. For instance, if a first partitioning of the query 104 produces a particular query portion 206 that is not assignable to any node 108 of the node set 106, the query 104 may be repartitioned into a different set of query portions 206 for which the assignment over the node set 106 is achievable; and/or the selection of nodes 108 for the query portions 206 may be based upon a cost estimation of completing a query 104 according to a particular query partitioning, as compared with other possible partitionings of the query 104.

As a sixth variation of this second aspect, the partitioning and/or node selection may be achieved by many architectural techniques. As a first such example, query partitioning and/or node selection may be performed in a centralized manner; e.g., a task management server may be provided to perform the partitioning of the query 104 and/or the selection of nodes 108 therefor. Alternatively or additionally, query partitioning and/or node selection may be performed in a decentralized manner. As a second such example, the nodes 108 of the node set 106 may volunteer to accept one or more query portions 206 of the query 104 (e.g., respective nodes 108 may individually self-monitor as to computational load and capabilities, and may offer to accept assignment of a particular query portion 206 that is compatible therewith). For instance, a consensus algorithm, such as Paxos, may be utilized by the node set 16 to achieve the selection of nodes 108 for the query portions 206. As a third such example, a partitioning and/or selection logic may be devised indicating how any query 104 is to be partitioned and allocated over the node set 106, and may be distributed to the nodes 108 of the node set 106. For a particular query 104, each node 108 of the node set 106 may locally perform the partitioning and/or selection logic, and may therefor identify one or more query portions 206 that the node 108 is responsible for evaluating based upon the results of the partitioning and/or selection logic.

As a seventh variation of this second aspect, node selection may be made in a dynamic and/or fluid manner. As a first such example, the partitioning of the query 104 and/or selection of nodes 108 therefor may occur as a precursor to distributing the query 104 to any of the nodes 108. As a second such example, partitioning and/or node selection may be performed in an iterative or ad-hoc manner; e.g., a first query portion 206 of the query 104 may be assigned to a first node 108, and a second query portion 206 of the query 104 may be assigned to a second node 108 only after the first node 108 has begun, and perhaps even completed, the processing of the first query portion 206. As a third such example, the assignment of query portions 206 to nodes 108 may represent other than a 1:1 assignment. For example, a particular node 108 may be assigned to evaluate more than query portion 206 of a query 104, and/or query portions 206 of multiple queries 104. Conversely, a single query portion 206 may be assigned to two or more nodes 108, e.g., to serve as a backup node (e.g., having a failover node 108 available to take over processing of a query portion 206 bay a filed node, and/or performance, e.g., a RAID-like processing technique wherein multiple nodes 108 redundantly perform a single query portion 206 in order to retain the results in case one node 108 fails. As a fourth such example, partitioning and/or node selection may be reevaluated, and adjustments to the partitioning and/or node selection may be initiated after commencement of the processing. For example, if a node 108 fails or becomes overloaded while processing a query portion 206, some or all of the query portions 206 assigned to the node 108 may be reassigned to other nodes 108 of the node set 106. Alternatively or additionally, if estimated capabilities and/or costs of a particular node 108 diverge from actual capabilities and/or costs, other nodes 108 may be selected to perform the query portion 206.

Figure 6:
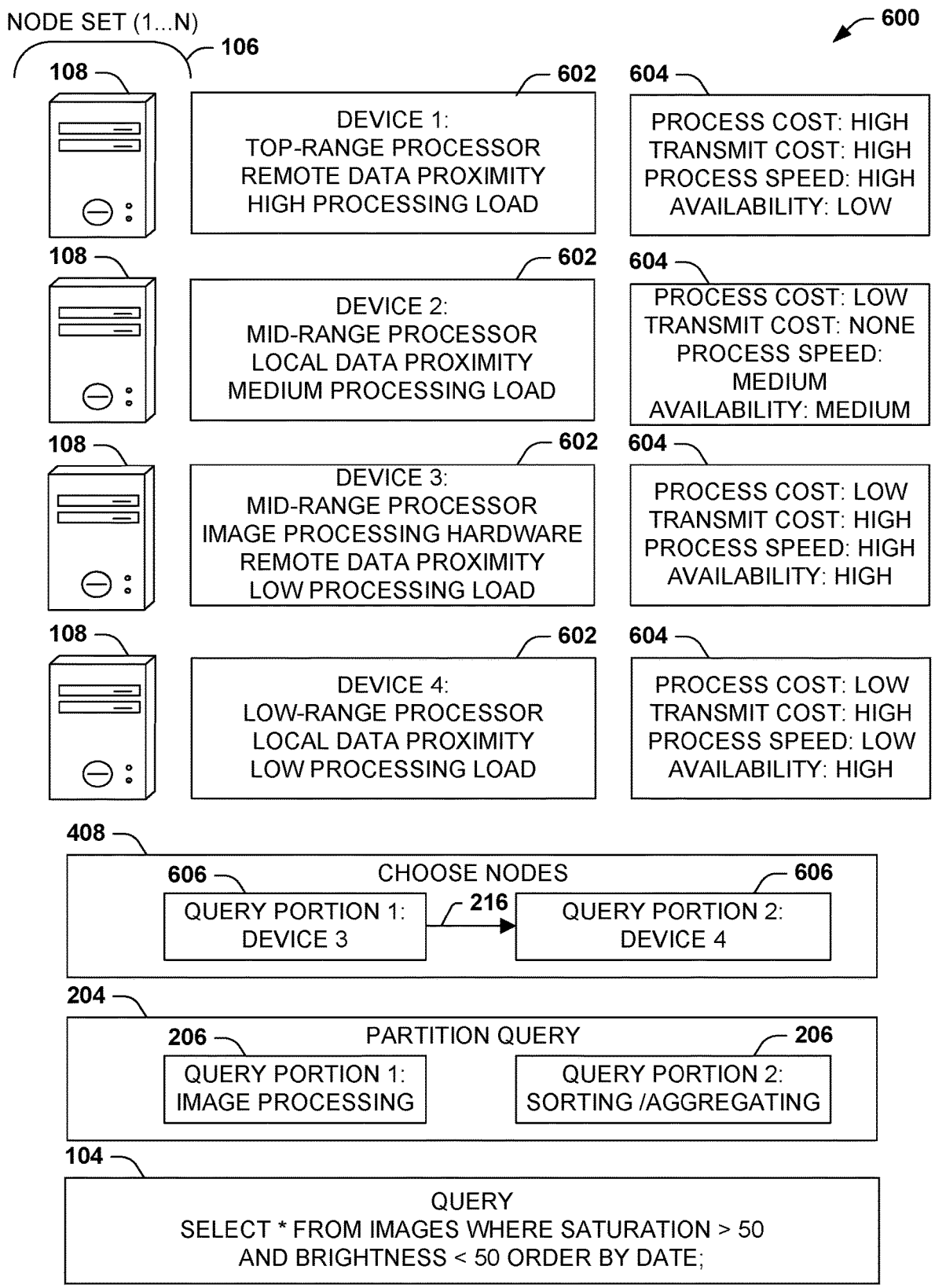
FIG. 6 is an illustration of an example scenario featuring a first partitioning of a query into query portions in view of the device characteristics of the nodes of a node set, in accordance with the techniques presented herein.

FIG. 6 is an illustration of a first example scenario 600 featuring a partitioning of a query 104 over a node set 106 of nodes 108. In this example scenario 600, a data set 102 is provided that comprises a set of images, and a query 104 over the data set 102 is received that involves an image processing technique (e.g., a determination of a saturation level and a brightness level of the respective images of the image set). A query partitioning 204 is partitioned into an image processing query portion 206 and a sorting and aggregating query portion 206 to assemble the query result. However, the data set 102 may not include metadata indicating such criteria for the respective images, the processing of the query 104 may involve an evaluation of the contents of the respective images to determine the brightness level and the saturation level. Such image evaluation may comprise a computationally intensive process, as compared with identifying records of a table using an index. Additionally, the criteria may not be specified according to an established query processing language such as SQL (e.g., the terms "saturation" and "brightness" may not correspond to any attribute of any table, but instead may identify calculable properties of the respective objects).

In view of these constraints, the nodes 108 of the node set 106 may be individually evaluated in order to perform the node selection 408 of for the respective query portions 606. Additionally, based on the properties of the respective nodes 108, one or more costs 604 may be considered that arise from the selection of the node 108 for one or both of the query portions 206. For example, a first node 108 may comprise a high-performance device 602 featuring a top-range processor, which may achieve a high processing throughput (e.g., rapid evaluation of the images) and completion of the evaluation of each query portion 206. However, the low availability of the device 602 (e.g., due to a high computational load for other tasks) and a high financial cost of reserving the high-performance device 602 may mitigate against its selection for one or both query partitions 206. Additionally, the high-performance device 602 may exhibit a remote data proximity, such that the images of the data set 102 have to be transmitted to the high-performance device 602 for processing, and such transmission may entail additional costs such as a transmit cost (e.g., an expenditure of bandwidth) and/or a further processing delay that mitigates the high-performance processing capability of the first device 602.

A second node 108 of the node set 106 may comprise a mid-range device 602 featuring a mid-range processor and a local data proximity to the data set 102, thereby reducing or eliminating processing and transmit costs. The device 602 may be carrying a medium computational load, such that selection of this second node 108 may entail a delay in the completion of other tasks allocated to the device 602.

A third node 108 of the node set 106 may comprise a mid-range device 602 featuring a similar mid-range processor and a low processing load (e.g., a high rate of idleness). The third device 602 may also feature a remote data proximity, thereby entailing a high transmit cost 604; however, the third device 604 may also comprise specialized image processing hardware, such as a field-programmable gate array (FPGA) or artificial neural network (ANN) that are particularly adapted for image processing in an expedient and efficient manner. This device 602 may therefore achieve the rapid evaluation of the images, and, despite the high transmit cost 604, may present a low overall cost if selected for image processing.

A fourth node 108 of the node set 106 may comprise a low-range device 602 featuring a commodity processor and exhibiting a low processing load and a local data proximity. While many of the costs 604 of selecting this device 602 for query processing may be reduced, the modest processing capabilities of this device 602 may entail a protracted delay in completion of the processing of the image processing query portion 206, though the query device 602 may be suitable for performing the sorting and aggregating query portion 206.

In view of the characteristics of these devices 602, a selection among the nodes 108 may be performed based on an evaluation of the costs 604 arising from such selection. For example, it may be economical to choose the third device 602 for the image processing query portion 206, and the fourth device 602 to perform the sorting and aggregation query portion 206. However, the costs upon which node selection 408 is performed may vary based on the circumstances and priorities arising therefrom (e.g., a first scenario may prioritize rapid completion as the highest priority; a second scenario may prioritize a reduction of financial costs in reserving processors and bandwidth; and a third scenario may reflect a mix of priorities). The various options may be examined (e.g., in a state search manner) in order to identify a desirable query partitioning and node selection based thereupon, in accordance with the techniques presented herein.

Figure 7:
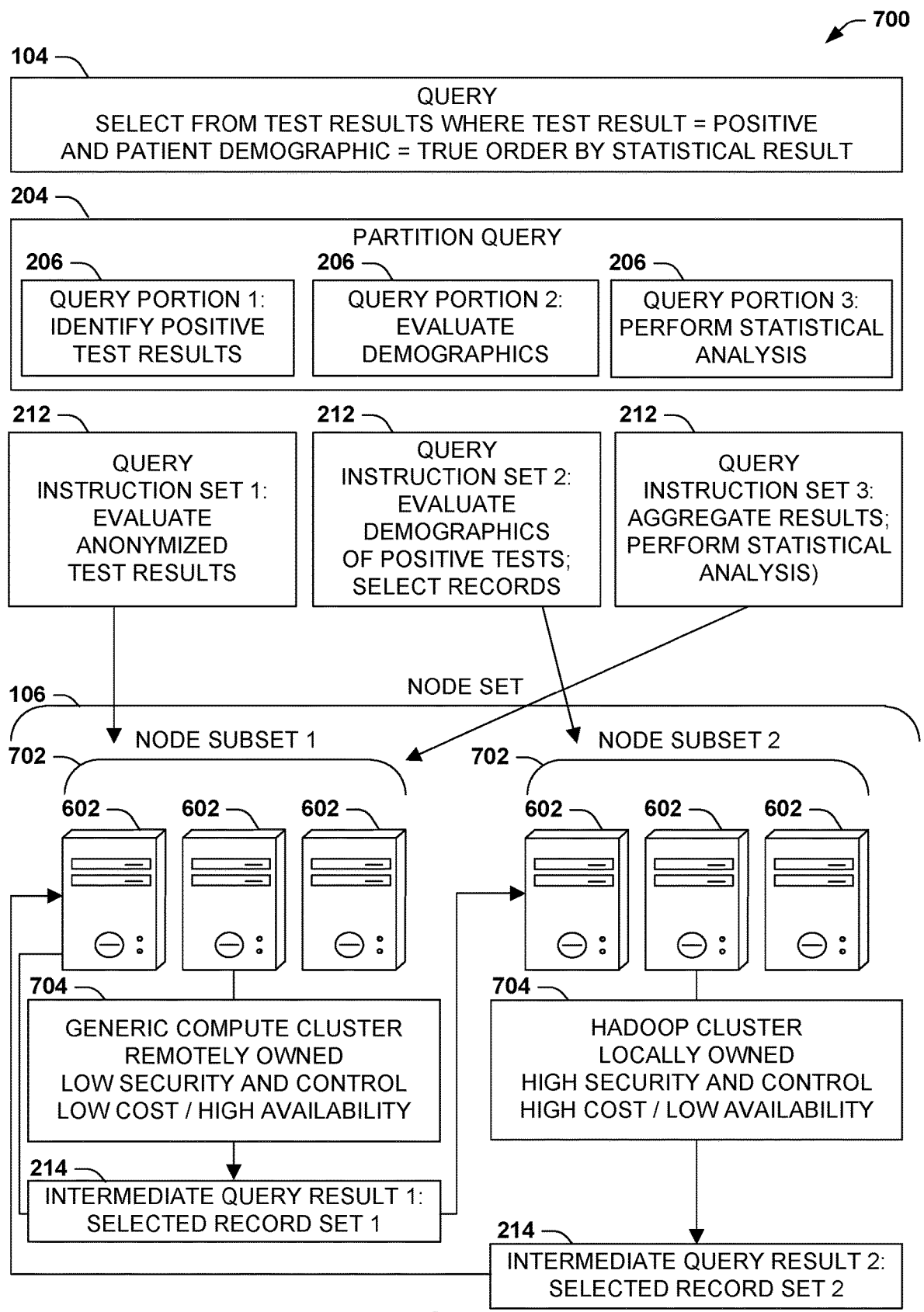
FIG. 7 is an illustration of an example scenario featuring a second partitioning of a query into query portions in view of the device characteristics of the nodes of a node set, in accordance with the techniques presented herein.

FIG. 7 is an illustration of a second example scenario 700 featuring a partitioning of a query 104 over a node set 106 of nodes 108. In this example scenario 700, the query 104 involves an evaluation of health records of various patients, such as may be performed in the context of medical research. Notably, while some query portions 106 may involve anonymized patient data, other query portions 106 may depend upon a correlation of patient data with individual patient demographics (e.g., a determination of the prevalence of a particular health condition or test result among patients within particular demographic classifications, such as age, gender, or medical history). While some portions of this query 104 may be evaluated in an anonymized manner, other portions may be constrained by medical research privacy and the types of nodes 108 that are permitted to access sensitive health record data. Accordingly, a query partitioning 204 may cause the query 104 to be partitioned into a first query portion 206 involving an anonymized evaluation of data (e.g., analysis of selected DNA segments to identify the presence of a gene); a second query portion 206 involving a highly sensitive comparison of the selected test results with patient demographics; and a third query portion 206 involving an anonymized, statistical evaluation of aggregated data (e.g., broadly extrapolating trends among the anonymized individuals within respective sections of a patient population).

The node set 106 in the example scenario 700 of FIG. 7 also involves a first node subset 702 comprising a set of devices 602 (e.g., a compute processing cluster) provided by a third party to perform generic computing. Although the first node subset 702 presents a comparatively low degree of security and control, the first node subset 702 may also be affordable and highly available. The node set 106 may also include a second node subset 702 comprising a set of devices 602 (e.g., a Hadoop cluster) that are secured and controlled by a research institution, but that present a high cost to allocate for query processing and/or a low availability due to other processing tasks. In order to partition the query 104 over the nodes of the node set 106, the characteristics 704 of the respective nodes 108 (e.g., the first node subset 702 and the second node subset 702) may be considered. The node selection may therefore select the first node subset 702 as the selected node 108 for the first query portion 206 involving anonymized DNA search; the second node subset 702 as the selected node 108 for the second query portion 206 involving sensitive demographic analysis; and the first node subset 702 as the selected node 108 for the third query portion 206 involving generic statistical analysis. Such node selection may enable a processing of the query 104 that achieves a cost-effective evaluation of the query 104 while maintaining privacy standards over the medical data. When the respective nodes 108 execute the query instruction sets 206, the first node subset 702 may perform the first query instruction set 206 and may transmit a first intermediate query result 214 to the second node subset 702; the second node subset 702 may perform the second query instruction set 206 with the first intermediate query result 214, and may transmit a second intermediate query result 214 back the first node subset 702; and the first nod subset 702 may perform the third query instruction set 206 on the second intermediate query result 214 and arrive at a completely processed query result, which may be provided in fulfillment to the query 104. Many such techniques may be utilized to partitioning the partitioning of the query 204 and the selection of nodes 108 therefor in accordance with the techniques presented herein.

E3. Instruction Set Generation and Deployment

A third aspect that may vary among embodiments involves the generation of instruction sets 212 that represent various query portions 206 of the query 104, and the deployment of the instructions sets 212 to the nodes 108 selected to perform the query 104.

As a first variation of this third aspect, respective nodes 108 of the node set 106 may provide a particular execution environment in which applications may be executed. For instance, a first node 108 may provide a generic computing model that accepts instruction sets 212 in a general-purpose programming language, such as Java or Python, using a standard set of application programming interfaces (APIs). A second node 108 may provide a resource-rich execution environment, featuring an extensive and possibly specialized set of APIs that are accessible to instruction sets 212. A third node 108 may be part of a database cluster that evaluates instruction sets 212 in a query language, such as a variant of the Structured Query Language (SQL). When any such node 108 is selected to evaluate a query portion 206, the instruction set 212 for the query portion 206 may be generated for the selected node 108 that is executable within the execution environment of the selected node 108.

Figure 8:
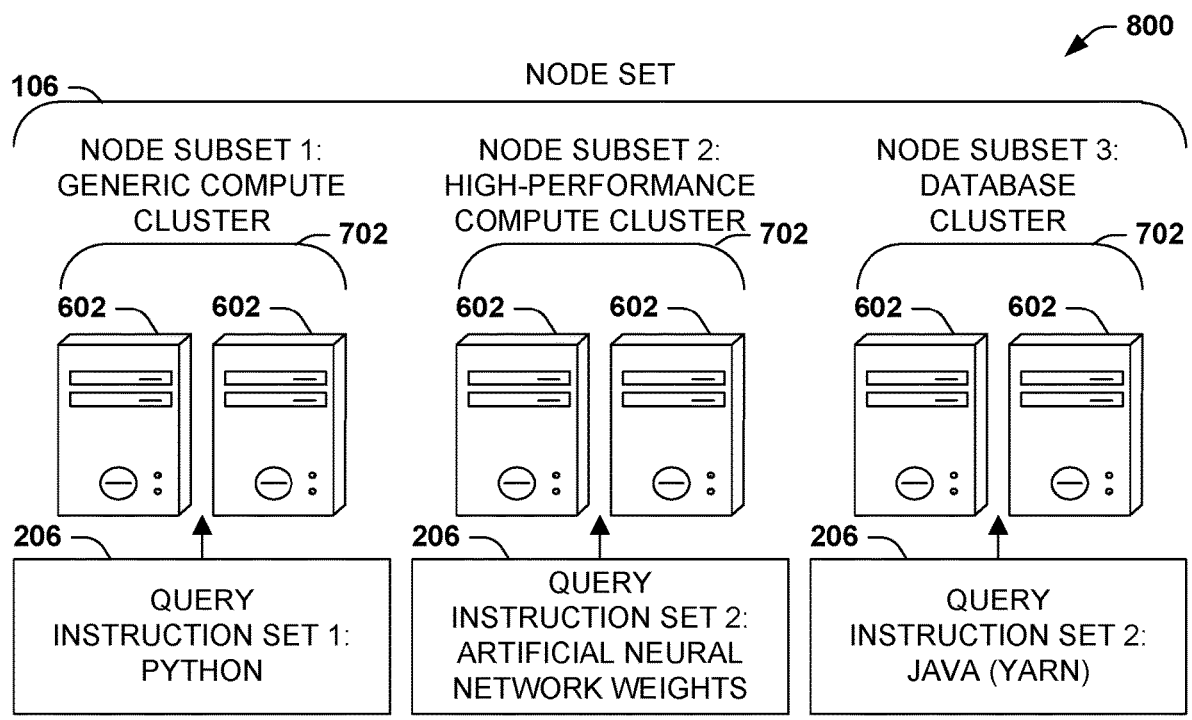
FIG. 8 is an illustration of an example scenario featuring the generation of query instruction sets for respective query portions of a query, in accordance with the techniques presented herein.

FIG. 8 is an illustration of an example scenario 800 featuring a node set 106 comprising various nodes 108 that are selectable to perform a query portion 206 of a query 104. In this example scenario 800, a first node subset 702 comprises devices 602 within a generic compute cluster featuring a version of the Python interpreter; a second node subset 702 comprises devices 602 that are particularly configured to apply artificial neural networks to data; and a third node subset 702 comprises a Hadoop database cluster. When the respective node subsets 702 are selected as nodes 108 to evaluate respective query portions 206, the instruction set 212 generated for and deployed to each node 108 may be generated in view of the execution environment of the node 108. For example, a first query instruction set 212 generated for the first node subset 702 may comprise a Python script. A second query instruction set 212 generated for the second node subset 702 may comprise a collection of artificial neural network weights that the nodes 108 are to use while applying an artificial network to an intermediate query result 214 received from the first node subset 702. The query instruction set 212 provided to a third node subset 702 may comprise a Java application executable within the YARN application framework of the Hadoop cluster. In this manner, the query portions 206 of the query 104 are expressed in a query instruction set 212 that is suitable for the execution environment of each selected node 108.

As a second variation of this third aspect, respective nodes 108 of the node set 106 may comprise a device type, such as a device featuring a particular instruction set architecture (e.g., an x86 architecture or a MIPS-type architecture), or various types of operating systems. The query instruction set 212 generated for a particular query portion 206 may therefore be generated according to the device type of the selected node 108 upon which the query portion 206 is to be evaluated. Additionally, the selection of nodes 108 from the node set 106 for various query portions 212 may result in the selection of a first node 108 of a first device type that transmits an intermediate query result 214 to a second node of a second device type that is different than the first device type. Because query instruction sets 212 are according to the device types of the respective selected nodes 108, the query 104 is processed in a distributed manner over a heterogeneous set of nodes 108, irrespective of architectural distinctions thereamong. Many techniques may be used to generate and deploy the instruction sets 212 to the nodes 108 for the respective query portions 206 of the query 104 in accordance with the techniques presented herein.

E4. Execution of Instruction Sets and Evaluation of Query

A fourth aspect that may vary among embodiments of the presented techniques involves the execution of the instruction sets 212 to evaluate the respective query portions 206 of the query 104, including the interoperation of the nodes 108 to exchange intermediate query results 214.

As a first variation of this fourth aspect, the processing of the query 104 over the data set 102 may be initiated in many ways. As a first such example, the transmission of a query instruction set 212 to a selected node 108 for a selected query portion 206 of the query 104 may also cause the node 108 to initiate execution of the query instruction set 212. As a second such example, a node 108 that represents a next selected node 322 in a query processing pipeline may store the query instruction set 212, and may initiate execution upon receiving an intermediate query result 214 from a preceding selected node 108 of the query processing pipeline. As a third such example, the node 108 may initially store the query instruction set 212 upon receipt, and once each node 108 in the node set 106 has received a query instruction set 212, a message may be distributed (e.g., by multicast or broadcast) for the nodes 108 to begin execution of the query instruction set 212.

As a second variation of this fourth aspect, respective nodes 108 may be in direct communication with the next selected node 322, and wherein transmitting the intermediate query result 214 further comprises transmitting the intermediate query result 214 directly to the next selected node 322, rather than materializing the intermediate query result 214 to storage, such that the next selected node 322 has to retrieve the intermediate query result 214 from storage. Direct transmission of intermediate query results 214 in this manner, as compared with read and write operations involving storage devices in the query processing, may raise the scalability and throughput of query processing, and/or reduce the complexity of the query processing architecture.

Figure 9:
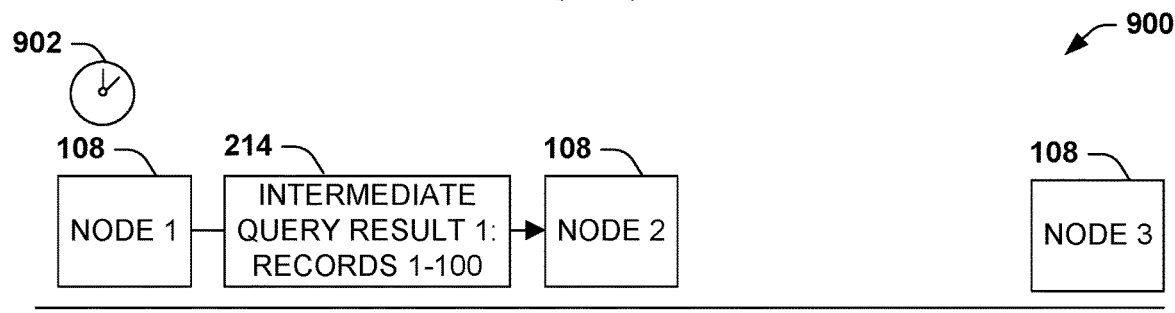
FIG. 9 is an illustration of an example scenario featuring a stream processing of a data set by a node of a node set, in accordance with the techniques presented herein.
Figure 9:
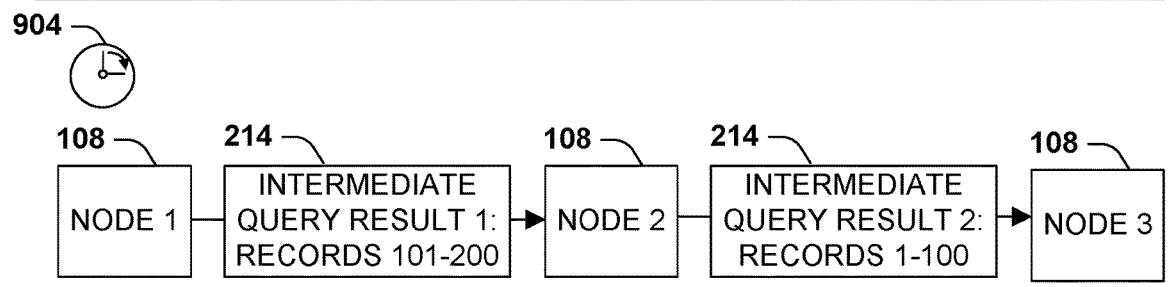
Figure 9:
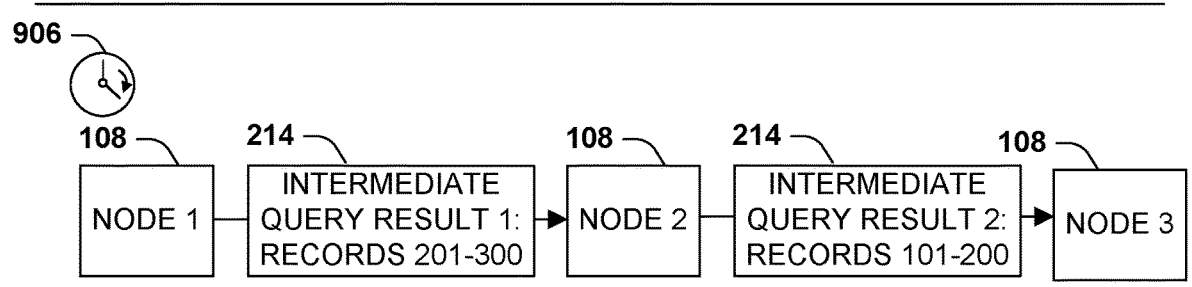

FIG. 9 is an illustration of an example scenario 900 featuring a third variation of this fourth aspect, wherein respective nodes 108 execute the instruction sets 212 over the data set 102 in an incremental manner, and exchange intermediate results 214 according to a streaming model. In this type of streaming model, a node 108 processes the query instruction set 212 to generate a first intermediate query result portion and a second intermediate query result portion, and transmits the first intermediate query result portion to the next selected node 322 before completing processing and generation of the second intermediate query result portion. In this example scenario 900, at a first time 902, a first node 108 generates a first intermediate query result 214 (e.g., an application of a first query instruction set 212 to a first subset of records of the data set 102), and transmits the first intermediate query result 214 to a second node 108, which represents the next selected node 322 in the processing. The second node 108 receives the first intermediate query result 214 and begins executing a second query instruction set 212 over the first intermediate query result 214. At a second time 904, the second node 108 completes the application of the second query instruction set 212 over the previously received first intermediate result 214, and generates a second intermediate query result 214, which is transmitted to a third node 108 representing the next node 322 in the processing of the query 102. Concurrently, the first node 108 generates another first intermediate query result 214 and transmits it to the second node 108 (e.g., completed by applying the first query instruction set 212 over a different set of records of the data set 102), and the second node 108 again receives the first intermediate query result 214 and begins execution of the second query instruction set 212 over the additional first intermediate query result 214. Similarly, at a third time 906, additional intermediate query results 214 may be generated by the respective nodes 108 and transmitted to the respective next selected node 322 in the query processing pipeline. The third node 108, as a terminal node in the pipeline, may either generate incremental query results 108 (e.g., a stream of records in the final result set of the query 104), or may collect the final results and provide all such records as a complete query result. In this manner, the query 104 is evaluated in an incremental manner, and results are transmitted as a stream from respective nodes 108 to the next selected node 322.

Figure 10:
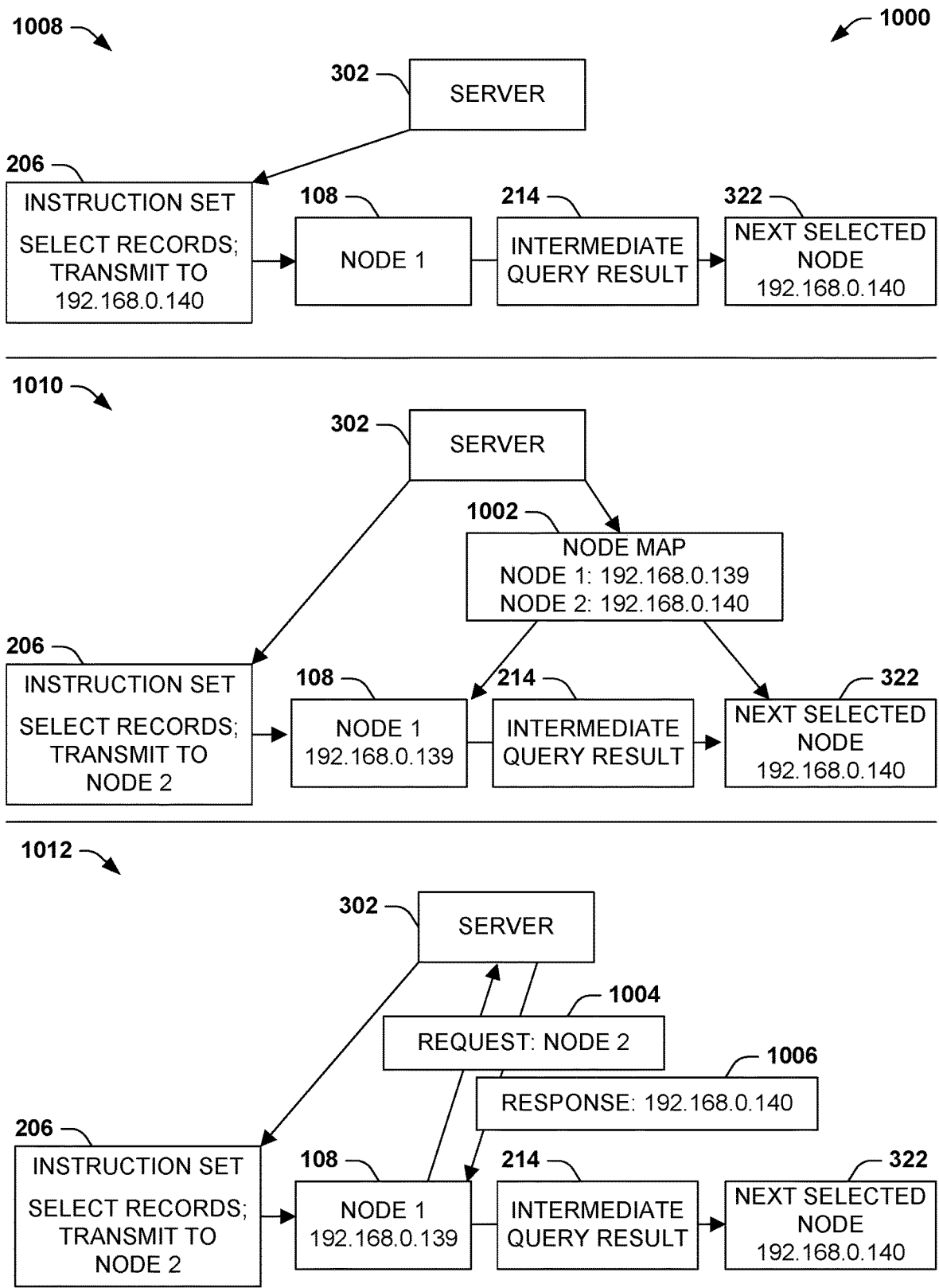
FIG. 10 is an illustration of an example scenario featuring various techniques for identifying a next selected node in a node set that is configured to receive an intermediate query result, in accordance with the techniques presented herein.

FIG. 10 is an illustration of an example scenario featuring a fourth variation of this fourth aspect, wherein respective nodes 108 determine the next selected node 322 in a query processing pipeline in various ways. As a first such example 1008, the query instruction set 212 includes transmit instructions that instruct a node 108 (e.g., by a server 302 coordinating the query processing pipeline) to transmit the intermediate query result 214 directly to a next selected node 108, e.g., by specifying a network address of the next selected node 322 to which the intermediate result 214 is to be transmitted. This variation may be advantageous, e.g., for enabling the nodes 108 to operate in an efficient manner, particularly where the nodes 108 selected to process the query 104 are comparatively static.

As a second such example 1010, the query instruction 206 may not directly identify the next selected node 322, but may provide an alias for the next selected node 108. The server 302 may distribute a node map 1002 that identifies the nodes 108 selected from the node set 106 to process the query 104 (e.g., indicating the network address of the node 108 assigned a particular alias). The selected node 108 may consult the node map 1002 to identify the next selected node 322 to which the intermediate query result 214 is to be transmitted, and may then transmit the intermediate query result 214 to the next selected node 322. This variation may be advantageous, e.g., for enabling the server 302 to adjust the selection of nodes 108 for the query 104.

As a third such example 1012, the server 302 may fulfill requests 1004 by the respective nodes 108 to identify the next selected node 322 in the processing pipeline. For example, when a node 108 completes a query instruction set 212 and generates an intermediate query result 214, the node 108 may contact the server 302 with a request 1004 to identify the next selected node 322, and the server 302 may provide a response 1006 that so identifies the next selected node 322 (e.g., by specifying its network address). The node 108 may then transmit the intermediate query result 214 to the next selected node 322. This variation may be advantageous, e.g., in scenarios featuring a highly dynamic selection of nodes 108 to process the query, such as where the server 302 provides load-balancing that enables a substitute node 108 to substitute for a next selected node 322 that is overloaded, exhibiting diminished performance, and/or has failed. These and other variations, including combinations thereof, may be utilized by the nodes 108 and/or the server 302 to organize the selected nodes 108 that together process the query 104.

As a fourth variation of this fourth aspect, many techniques may be utilized to handle a failure of one or more nodes 108 during the processing of a query 104. As a first example of this fourth variation of this fourth aspect, the server 302 may choose a substitute node 108 for the node 108 that has failed, which may involve notifying a previous node 108 in the query processing pipeline to redirect intermediate query results 214 to the substitute node. As shown in the third example 1012 of FIG. 10, the server 302 may mediate this process through a check-in mechanism, where nodes 108 contact the server 302 to request an identification of the next selected node 322 in order to send an intermediate query result 214. Additionally, the server 302 may attempt to resume the query 104 at a last known point, such as a checkpoint, which may include examining the final result set to identify and remove duplicate results. As a second such example, the server 302 may initiate a failure of the query 104 (e.g., notifying all of the selected nodes 108 to stop processing the query 104), and, after choosing a substitute selected node to perform a query portion that was allocated the failed selected node 108, may reinitiate the query 104 among the selected nodes 108. This example may be advantageous, e.g., in scenarios where it is difficult to determine how much of the query 104 was successfully processed prior to the failure. The failure may include a rollback process if the query 104 involves transactions that are anticipated to be performed atomically on the data set 102, and/or a revocation, invalidation, and/or deletion of partial query results. Many such techniques may be utilized to initiate, perform, and manage the execution of the query instruction sets 212 and the evaluation of the query 104 by the selected nodes 108 in accordance with the techniques presented herein.

F. Computing Environment

Figure 11:
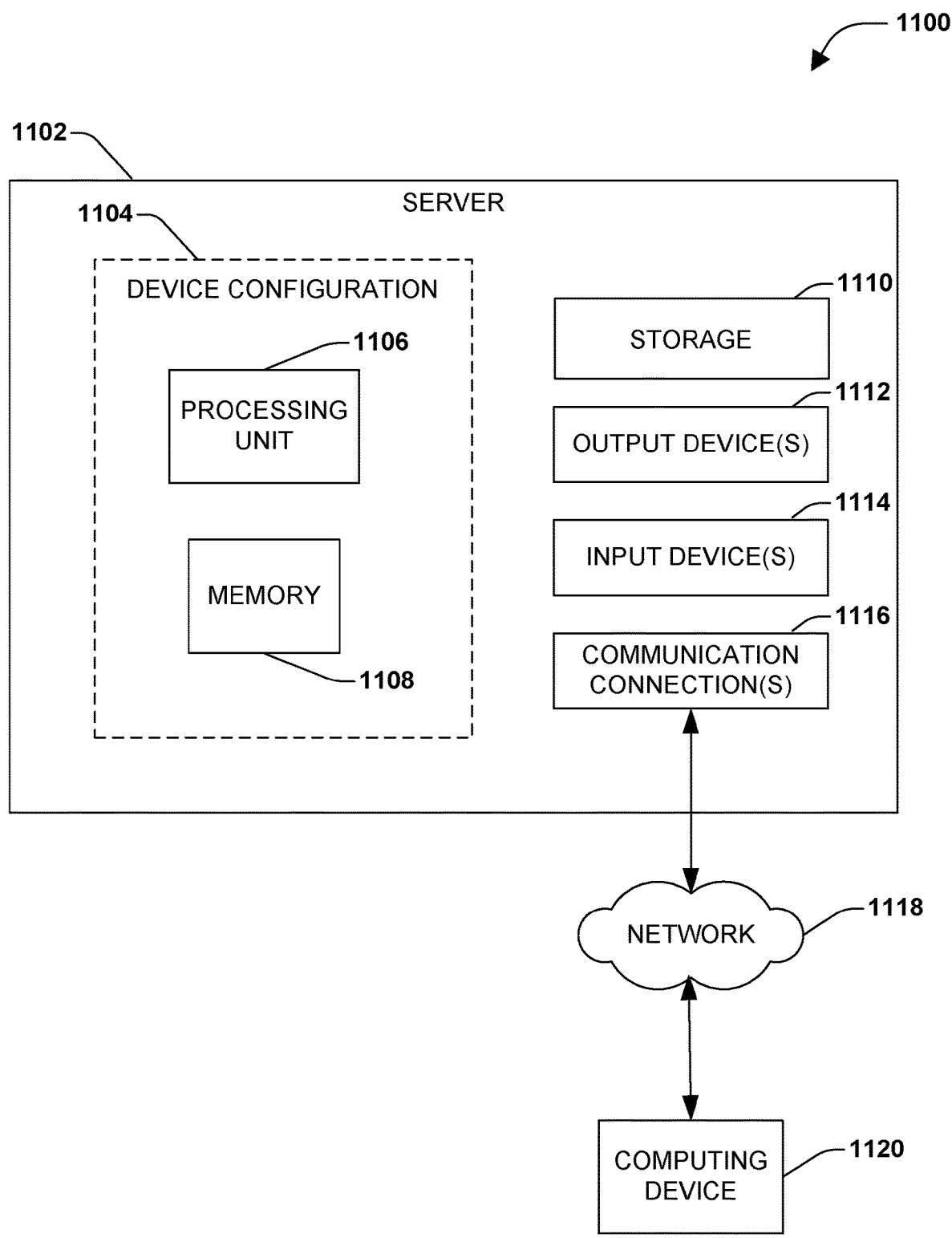
FIG. 11 is an illustration of an example computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1100 comprising a computing device 1102 configured to implement one or more embodiments provided herein. In one configuration, computing device 1102 includes at least one processing unit 1106 and memory 1108. Depending on the exact configuration and type of computing device, memory 1108 may be volatile (such as RAM, for example), non-volatile (such as ROM, flash memory, etc., for example) or some combination of the two. This configuration is illustrated in FIG. 11 by dashed line 1104.

In other embodiments, device 1102 may include additional features and/or functionality. For example, device 1102 may also include additional storage (e.g., removable and/or non-removable) including, but not limited to, magnetic storage, optical storage, and the like. Such additional storage is illustrated in FIG. 11 by storage 1110. In one embodiment, computer readable instructions to implement one or more embodiments provided herein may be in storage 1110. Storage 1110 may also store other computer readable instructions to implement an operating system, an application program, and the like. Computer readable instructions may be loaded in memory 1108 for execution by processing unit 1106, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1108 and storage 1110 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1102 may also include communication connection(s) 1116 that allows device 1102 to communicate with other devices. Communication connection(s) 1116 may include, but is not limited to, a modem, a Network Interface Card (NIC), an integrated network interface, a radio frequency transmitter/receiver, an infrared port, a USB connection, or other interfaces for connecting computing device 1102 to other computing devices.

Communication connection(s) 1116 may include a wired connection or a wireless connection. Communication connection(s) 1116 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1102 may include input device(s) 1114 such as keyboard, mouse, pen, voice input device, touch input device, infrared cameras, video input devices, and/or any other input device. Output device(s) 1112 such as one or more displays, speakers, printers, and/or any other output device may also be included in device 1102. Input device(s) 1114 and output device(s) 1112 may be connected to device 1102 via a wired connection, wireless connection, or any combination thereof. In one embodiment, an input device or an output device from another computing device may be used as input device(s) 1114 or output device(s) 1112 for computing device 1102.

Components of computing device 1102 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1102 may be interconnected by a network. For example, memory 1108 may be comprised of multiple physical memory units located in different physical locations interconnected by a network.

Those skilled in the art will realize that storage devices utilized to store computer readable instructions may be distributed across a network. For example, a computing device 1120 accessible via network 1118 may store computer readable instructions to implement one or more embodiments provided herein. Computing device 1102 may access computing device 1120 and download a part or all of the computer readable instructions for execution. Alternatively, computing device 1102 may download pieces of the computer readable instructions, as needed, or some instructions may be executed at computing device 1102 and some at computing device 1120.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A server that executes a query, the server comprising:
a processor; and
a memory storing instructions, wherein execution of the instructions by the processor causes the server to:
    partition the query into at least two query portions;
    for a selected query portion:
        choose, from a node set including two or more different nodes, a selected node to perform the selected query portion based at least on a query type of the selected query portion and the selected node having a different allocation of physical hardware resources from one or more unselected nodes of the node set, the different allocation of physical hardware resources of the selected node including a type of processing resource not included in the one or more unselected nodes of the node set, the type of processing resource capable of performing the selected query portion;
        generate a query instruction set for the selected node, wherein the query instruction set is executable to cause the selected node to:
            perform the selected query portion, and
            when the selected query portion generates an intermediate query result, transmit the intermediate query result to a next selected node of the node set; and
        deploy the query instruction set to the selected node.

2. The server of claim 1, wherein:
the selected query portion involves query processing of a selected query processing type; and
wherein the instructions executable to cause the server to choose the selected node for the selected query portion further comprise instructions executable to:
    evaluate respective nodes of the node set to identify candidate nodes that are capable of performing query processing of the selected query processing type; and
    among the candidate nodes, choose the selected node for the selected query portion.

3. The server of claim 1, wherein:
the selected query portion involves a resource; and
wherein the instructions executable to cause the server to choose the selected node for the selected query portion further comprise instructions executable to:
    evaluate respective nodes of the node set to identify candidate nodes that have access to the resource involved in the selected query portion; and
    among the candidate nodes, choose the selected node for the selected query portion.

4. The server of claim 1, wherein:
the selected query portion involves proprietary processing;
the node set further comprises:
    at least one trusted node that is trusted to perform the proprietary processing, and
    at least one untrusted node that is not trusted to perform the proprietary processing; and
the instructions executable to cause the server to choose the selected node for the selected query portion further comprise instructions executable to:
    choose the selected node only from among the at least one trusted node of the node set.

5. The server of claim 1, wherein the instructions executable to cause the server to choose the selected node for the selected query portion further comprise instructions executable to:

estimate processing costs of utilizing respective nodes of the node set to perform the selected query portion; and
choose the selected node for the selected query portion according to the processing costs of the respective nodes.

6. The server of claim 5, wherein:
the selected query portion involves a data set that is not stored by a first node of the node set; and
wherein the instructions executable to cause the server to estimate the processing cost for the first node of the node set further comprise instructions executable to:
estimate the cost of delivering the data set to the first node of the node set.

7. The server of claim 1, wherein the instructions executable to cause the server to choose the selected node for the selected query portion further comprise instructions executable to:
estimate a processing performance of the selected node for the selected query portion; and
wherein the instructions executable to choose the selected node for the selected query portion further comprise instructions executable to:
choose the selected node according to the processing performance of the selected node.

8. A client device that participates in a query executed by a node set, the client comprising:
a processor; and
a memory storing instructions executable by the processor to cause the client device to:
receive a query instruction set, generated for the client device, that expresses a query portion of the query and that specifies a next selected node of the node set, the query instruction set being received based at least upon a query type of the query portion and the client device having a different allocation of physical hardware resources from one or more unselected nodes of the node set, the different allocation of physical hardware resources of the client device including a type of processing resource not included in the one or more unselected nodes of the node set, the type of processing resource capable of performing the query portion;
execute the query instruction set for the query portion to produce an intermediate query result; and
transmit the intermediate query result to the next selected node of the node set.

9. The client device of claim 8, wherein:
the instructions executable to cause the client device to execute the query instruction set further comprise instructions executable to cause the client device to:
receive, from a previous selected node of the node set, a first intermediate result produced by performing a previous query portion of the query; and
execute the query instruction set over the first intermediate result to produce a second intermediate query result; and
wherein the instructions executable to cause the client device to transmit the intermediate query result further comprise instructions executable to cause the client device to:
transmit the second intermediate query result to the next selected node of the node set.

10. The client device of claim 8, wherein the instructions are further executable to:
cause the client device to process the query instruction set to generate a first intermediate query result portion and a second intermediate query result portion;

cause the client device to initiate transmitting of the first intermediate query result portion to the next selected node before completing processing and generation of the second intermediate query result portion.

11. The client device of claim 8, wherein:
the client device is in direct communication with the next selected node; and
the instructions are further executable to transmit the intermediate query result directly to the next selected node of the node set.

12. The client device of claim 8, wherein:
the instructions are further executable to cause the client device to receive a node map that identifies the nodes of the node set that process one or more query portions of the query; and the instructions are further executable to identify the next selected node according to the node map.

13. The client device of claim 8, wherein:
the query instruction set further comprises transmit instructions executable to transmit the intermediate query result to the next selected node of the node set.

14. A method of executing a query using a node set comprising a plurality of nodes, the method performed by a server and comprising:
partitioning the query into at least two query portions;
for a selected query portion:
choosing, from the node set, a selected node to perform the selected query portion, wherein the selected node is chosen based at least on a query type of the selected query portion and the selected node having a different allocation of physical hardware resources from of one or more unselected nodes of the node set, the different allocation of physical hardware resources of the selected node including a type of processing resource not included in the one or more unselected nodes of the node set, the type of processing resource capable of performing the selected query portion;
generating a query instruction set for the selected node, wherein the query instruction set is executable to cause the selected node to:
perform the selected query portion of the query, and
when the selected query portion generates an intermediate query result, transmit the intermediate query result to a next selected node of the node set; and
deploying the query instruction set to the selected node.

15. The method of claim 14, wherein:
the selected node for the selected query portion further provides an execution environment; and
generating the query instruction set for the selected node further comprises:
generating a query instruction set that is executable within the execution environment of the selected node.

16. The method of claim 15, wherein:
the execution environment further comprises Hadoop;
the selected node further comprises a Hadoop node of a Hadoop cluster; and
generating the query instruction set further comprises:
generating a YARN application that is executable by the Hadoop node within Hadoop to perform the selected query portion of the query.

17. The method of claim 14, wherein:
the selected node for the selected query portion further comprises a general-purpose compute node that performs general-purpose computation in a language; and generating the query instruction set further comprises:
   generating the query instruction set in the language for execution by the general-purpose compute node to perform the selected query portion of the query.

18. The method of claim 14, wherein:
the selected node for the selected query portion further comprises a device type; and
generating the query instruction set further comprises:
   generating the query instruction set according to the device type of the selected node.

19. The method of claim 18, wherein the selected query portion is a first selected query portion, and wherein:
   a first selected node for the first selected query portion further comprises a first device type;
   a second selected node for a second selected query portion further comprises a second device type that is different than the first device type of the first selected node; and
   generating the query instruction set further comprises:
      generating, for the first selected node, a first query instruction set according to the first device type of the first selected node; and
      generating, for the second selected node, a second query instruction set according to the second device type of the second selected node.

20. The method of claim 14, further comprising: responsive to a failure of the selected node of the node set:
   initiate a failure of the query; and
   reinitiate the query, including choosing, from the node set, a substitute selected node to perform the selected query portion that was allocated to the selected node.

* * * * *